Figure 1:
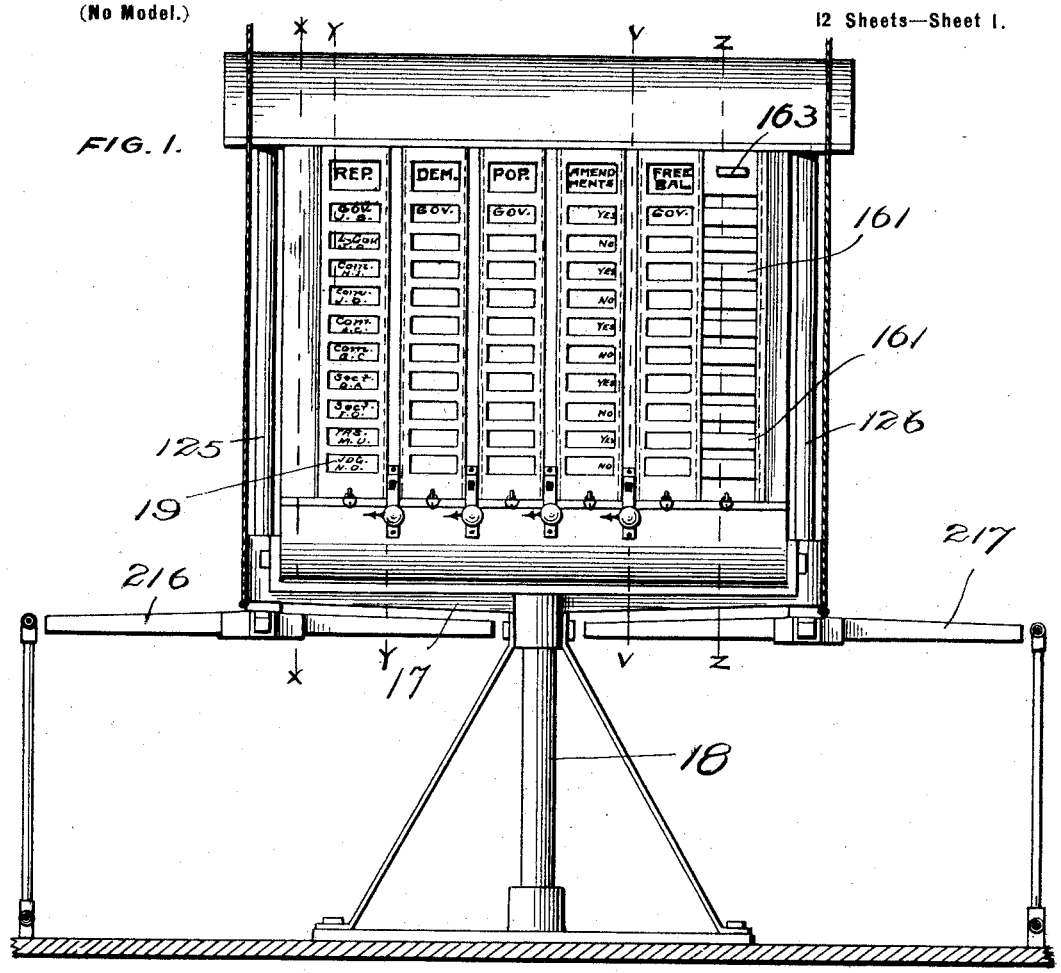

No. 622,192. Patented Mar. 28, 1899.
J. H. DEAN.
VOTING MACHINE.
(Application filed Dec. 31, 1897.)
(No Model.) 12 Sheets—Sheet 1.

WITNESSES. INVENTOR.
James H. Dean.

No. 622,192. J. H. DEAN. VOTING MACHINE. (Application filed Dec. 31, 1897.) Patented Mar. 28, 1899.
(No Model.) 12 Sheets—Sheet 2.

Witnesses:
J. Jensen
Richard Paul.

Inventor:
James H. Dean.
By Paul Hawley
his attorneys.

No. 622,192. Patented Mar. 28, 1899.
J. H. DEAN.
VOTING MACHINE.
(Application filed Dec. 31, 1897.)
(No Model.) 12 Sheets—Sheet 3.
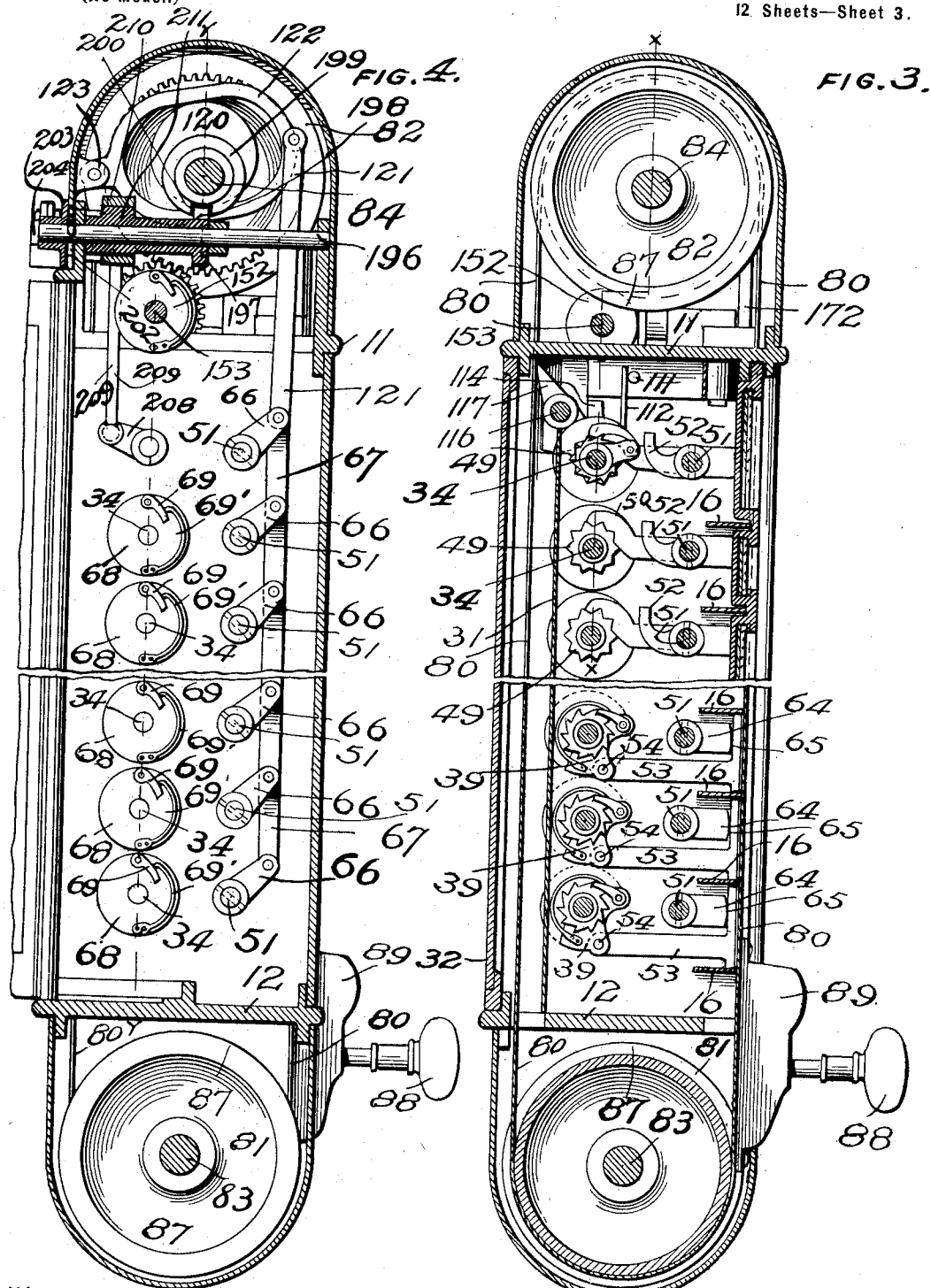
WITNESSES.
J. Jessen
Richard Paul.
INVENTOR.
James H. Dean
By
Paul D. Hawley
his attorneys

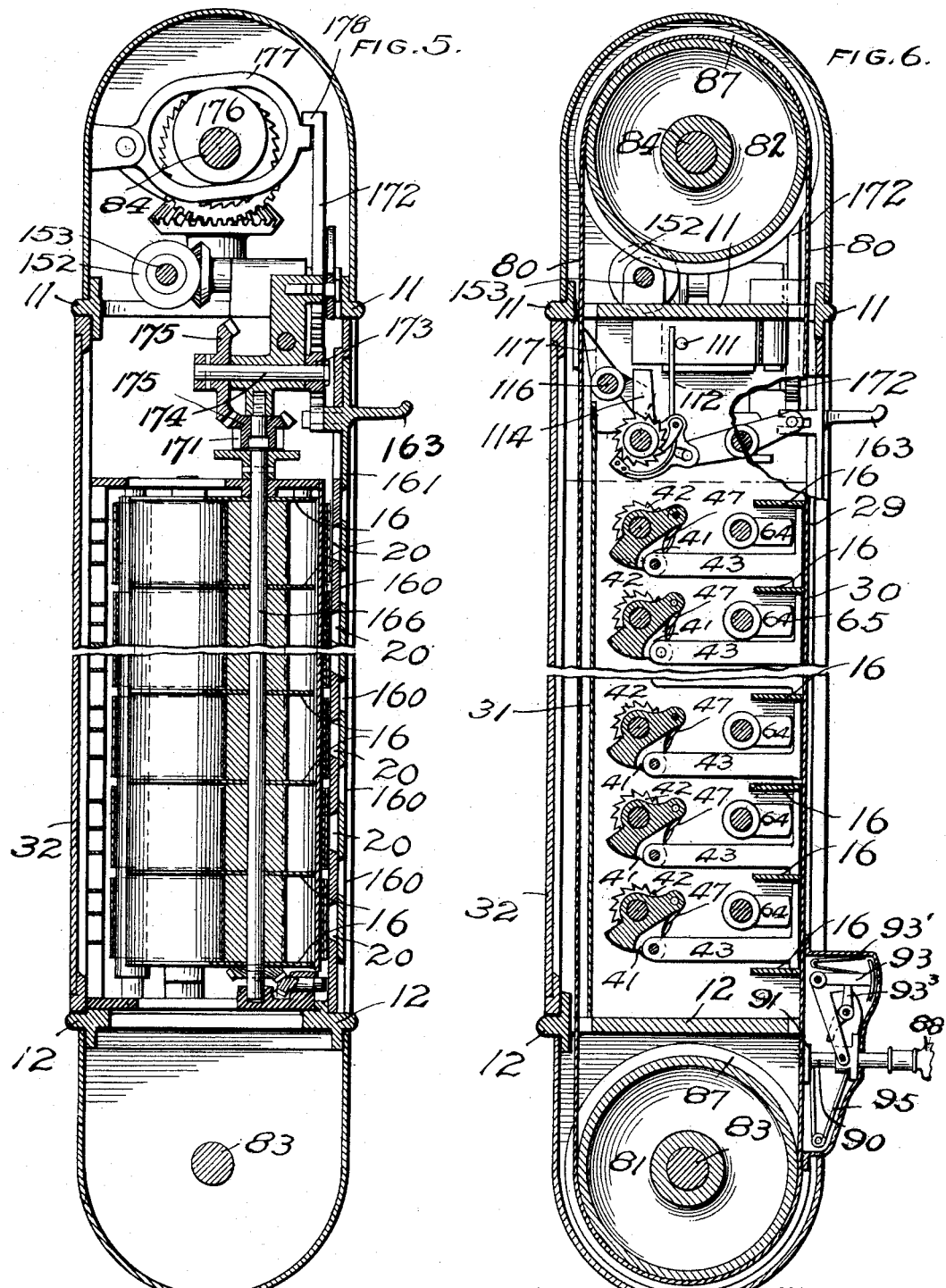

No. 622,192. Patented Mar. 28, 1899.
J. H. DEAN.
VOTING MACHINE.
(Application filed Dec. 31, 1897.)
(No Model.) 12 Sheets—Sheet 5.
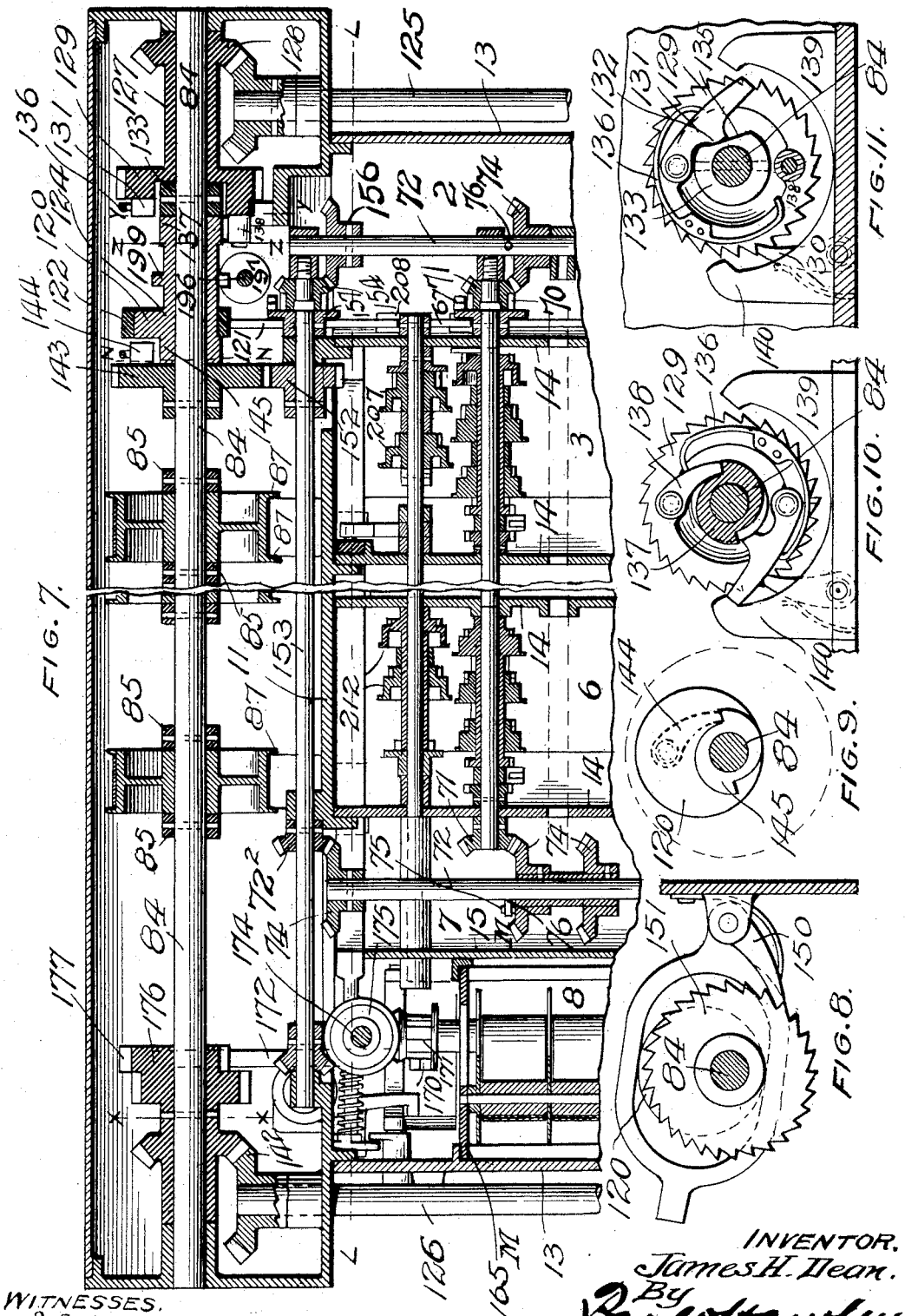
INVENTOR.
James H. Dean.
By Paul O. Hawley
his attorneys
WITNESSES.

No. 622,192. Patented Mar. 28, 1899.
J. H. DEAN.
VOTING MACHINE.
(Application filed Dec. 31, 1897.)
(No Model.) 12 Sheets—Sheet 6.
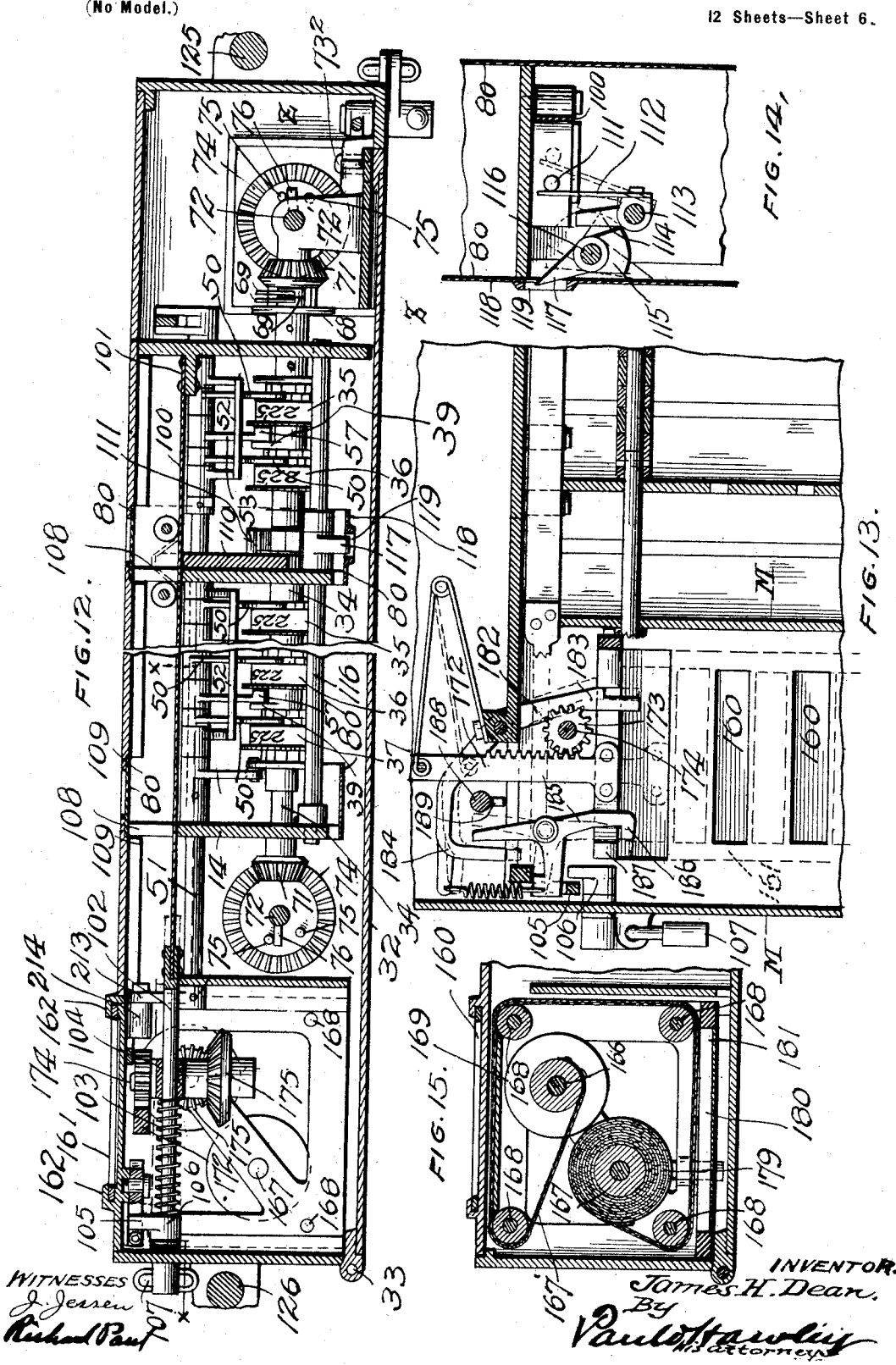

No. 622,192. Patented Mar. 28, 1899.
J. H. DEAN.
VOTING MACHINE.
(Application filed Dec. 31, 1897.)
(No Model.) 12 Sheets—Sheet 7.
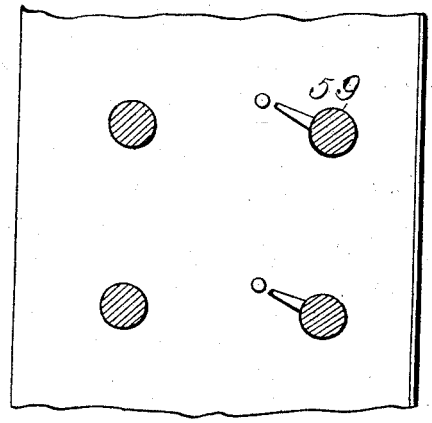
FIG. 21.
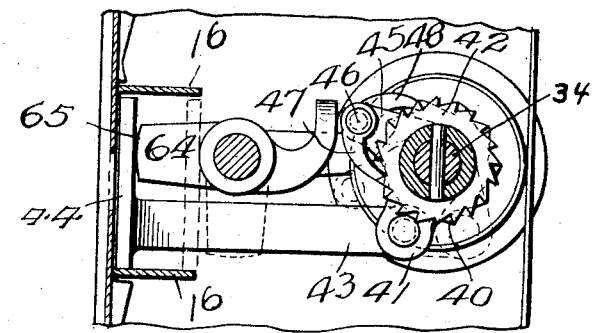
FIG. 16.
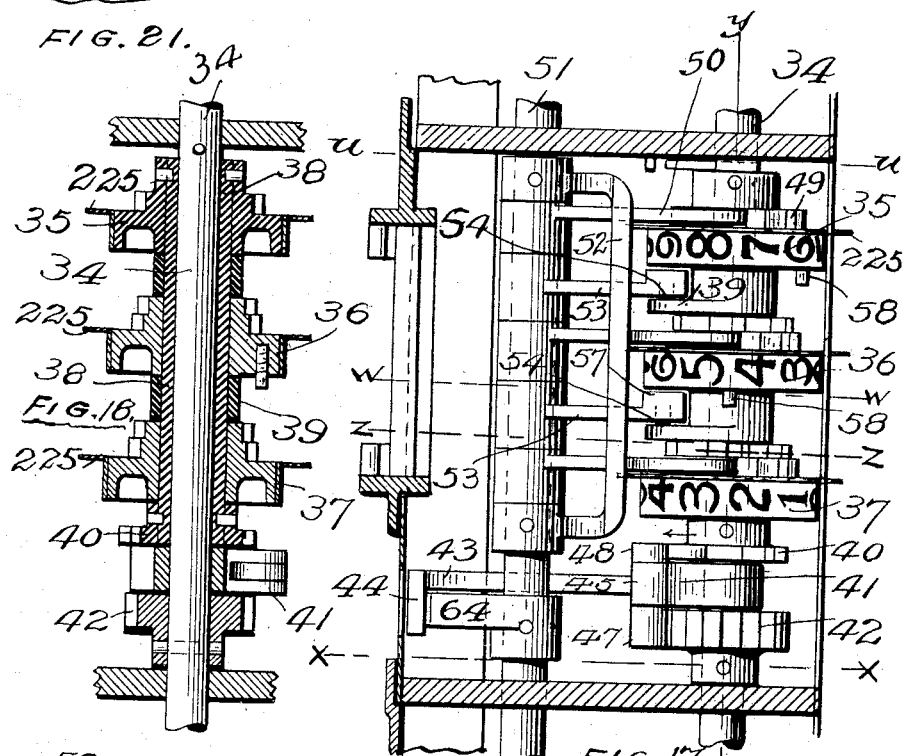
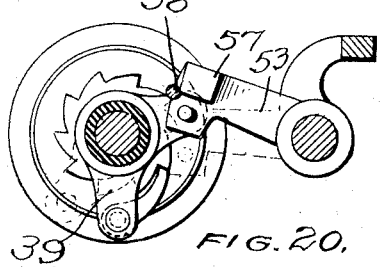
FIG. 20.
Witnesses;
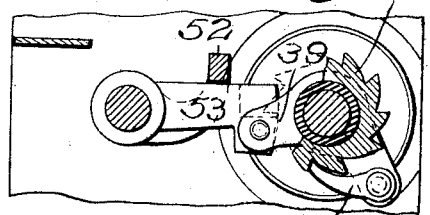
FIG. 19.
Inventor;
James H. Dean.
By Paul Hawley
his attorneys

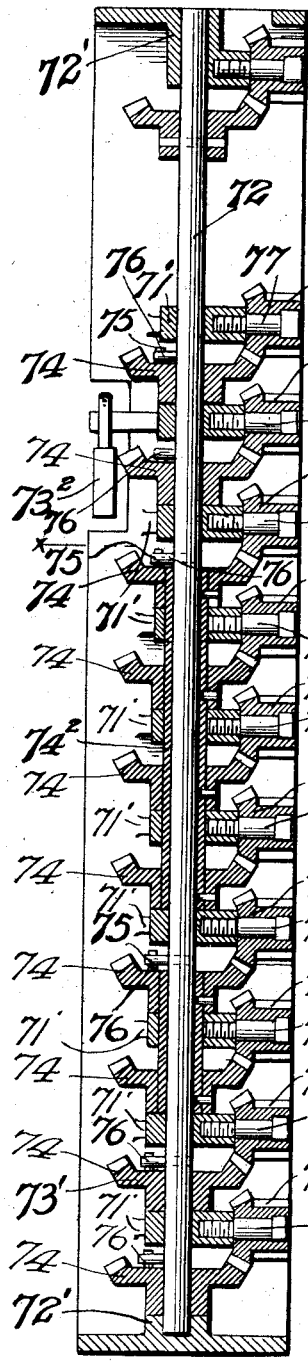
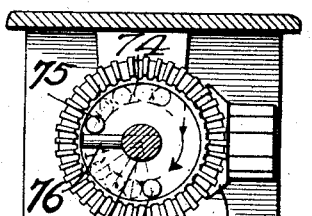
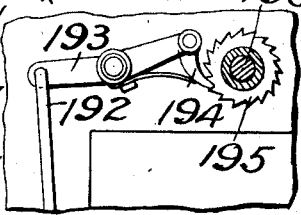
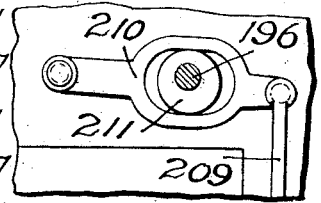
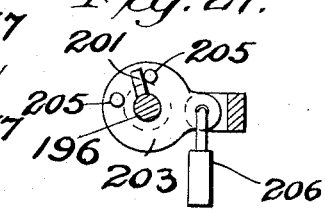
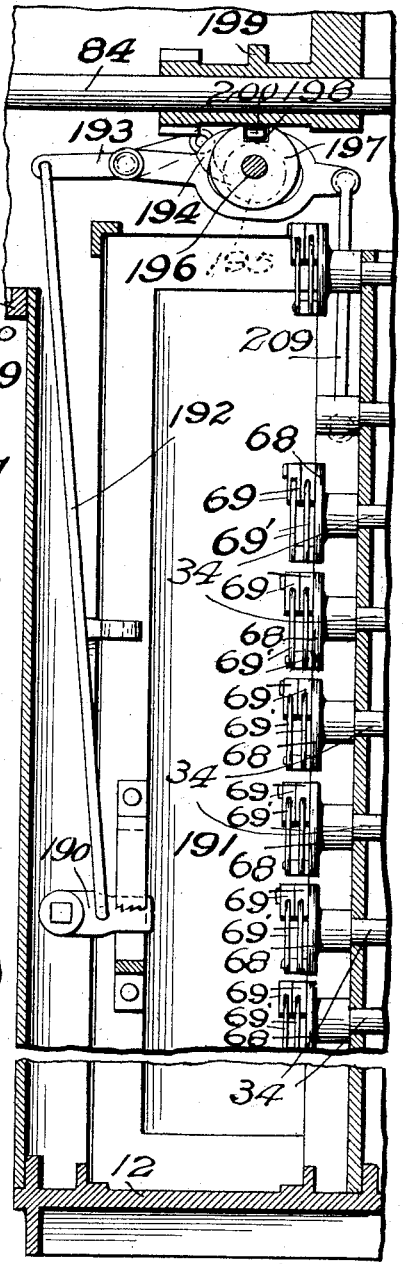

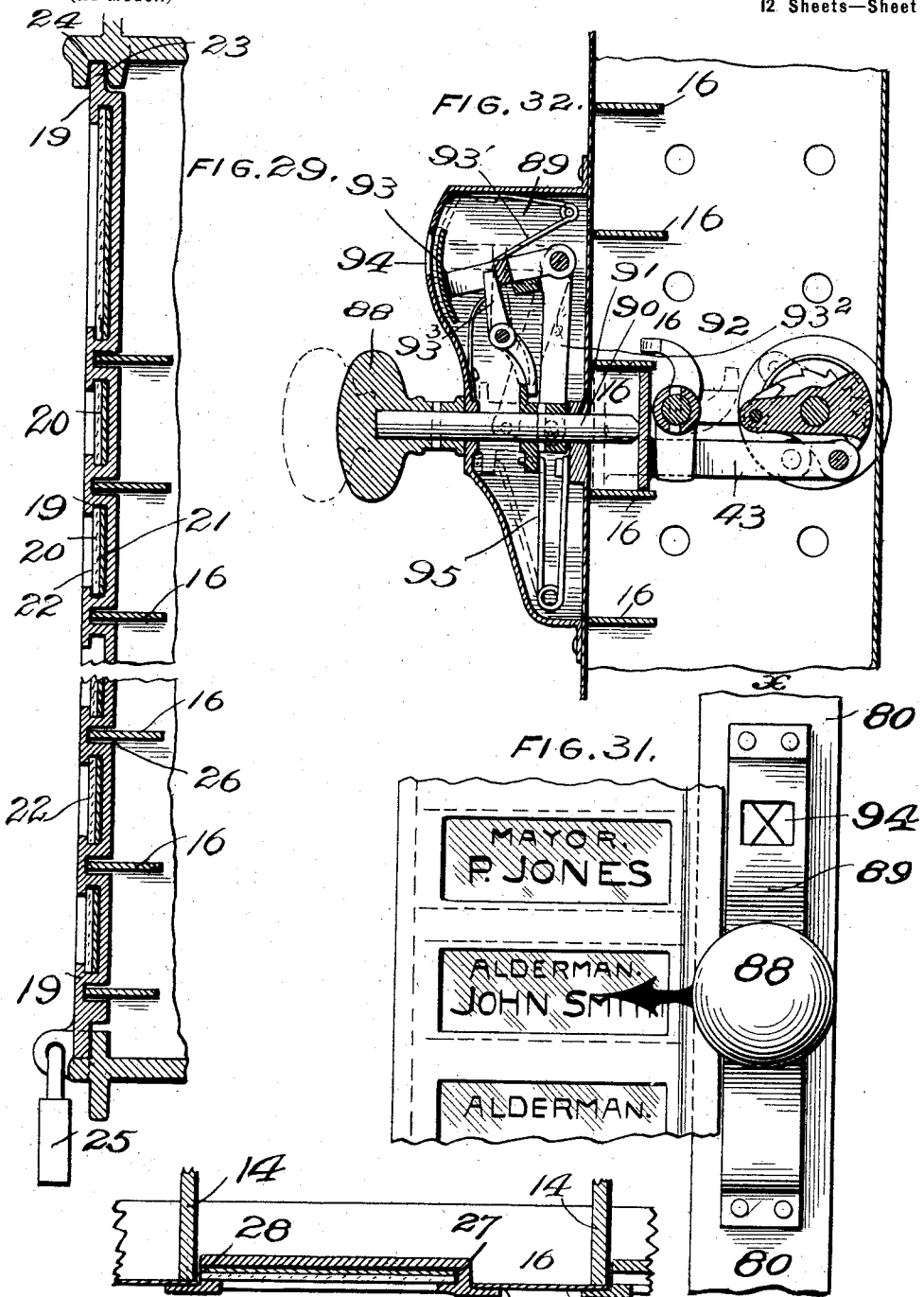

No. 622,192. Patented Mar. 28, 1899.
J. H. DEAN.
VOTING MACHINE.
(Application filed Dec. 31, 1897.)
(No Model.) 12 Sheets—Sheet 10.
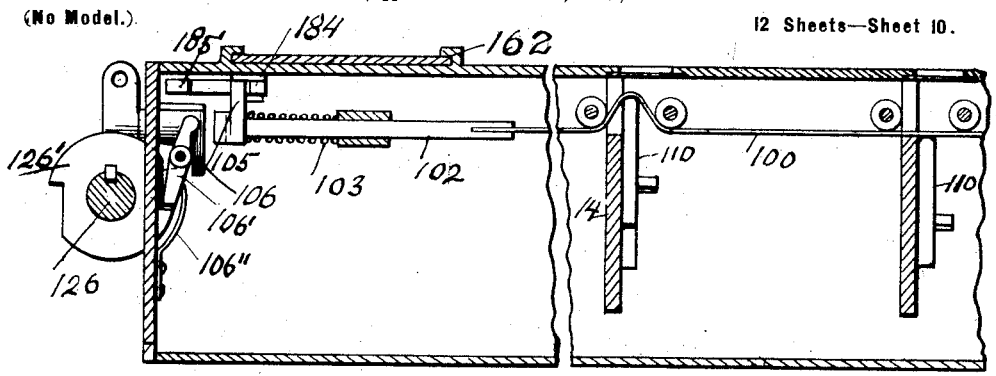
FIG. 34.
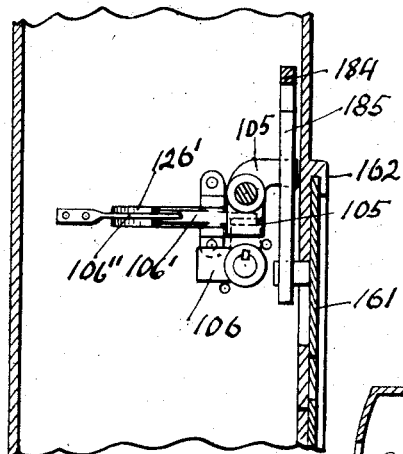
FIG. 35.
FIG. 33.
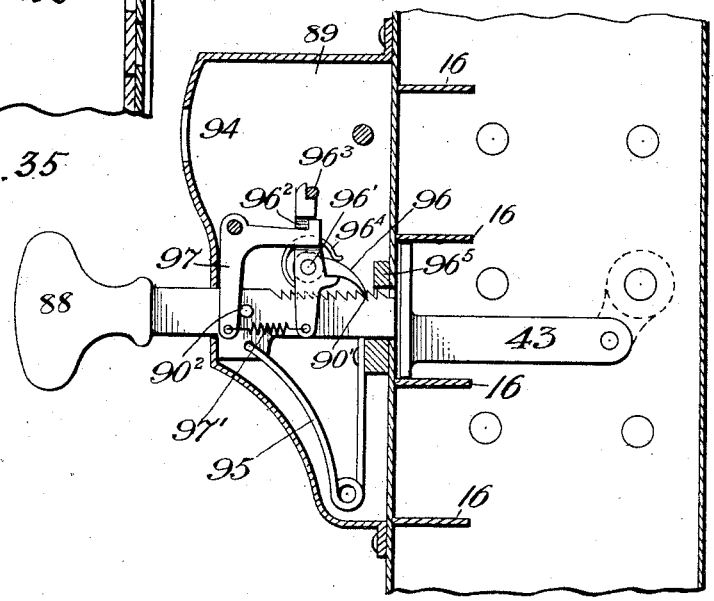
WITNESSES
J. Jensen
Richard Paul
INVENTOR.
James H. Dean,
By Paul Hawley
his attorneys.

No. 622,192. Patented Mar. 28, 1899.
J. H. DEAN.
VOTING MACHINE.
(Application filed Dec. 31, 1897.)
(No Model.) 12 Sheets—Sheet 11.
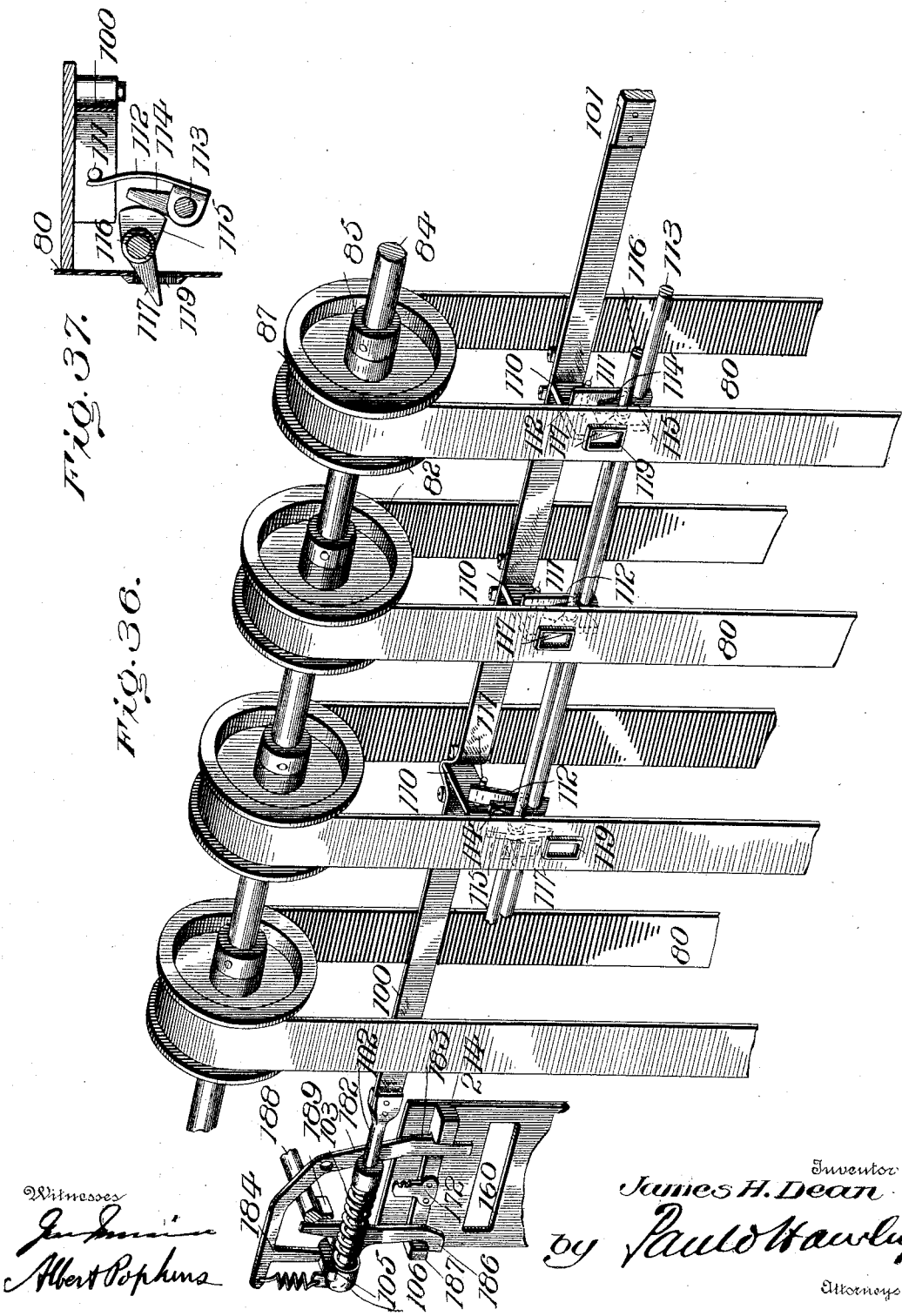

No. 622,192.  
J. H. DEAN.  
VOTING MACHINE.  
(Application filed Dec. 31, 1897.)  
Patented Mar. 28, 1899.

(No Model.)  
12 Sheets—Sheet 12.

Witnesses  
Inventor  
James H. Dean  
by Paul O. Hawley  
Attorneys

UNITED STATES PATENT OFFICE.

JAMES H. DEAN, OF ST. PAUL, MINNESOTA, ASSIGNOR TO ROSCOE F. HERSEY AND GEORGE R. FINCH, OF SAME PLACE.

VOTING-MACHINE.

SPECIFICATION forming part of Letters Patent No. 622,192, dated March 28, 1899.

Application filed December 31, 1897. Serial No. 665,108. (No model.)

*To all whom it may concern:*

Be it known that I, JAMES H. DEAN, of the city of St. Paul, county of Ramsey, State of Minnesota, have invented certain new and useful Improvements in Voting-Machines, of which the following is a specification.

My invention relates to improvements in voting-machines, and particularly to improvements upon the voting-machine shown and described in my pending application entitled a "Voting-Machine," filed May 17, 1897, Serial No. 636,838.

The objects of this invention are to simplify and improve the mechanism shown in the above-mentioned application and substitute positive mechanical actions for the spring-movements employed in the early machine, to provide means whereby the same machine is adapted for use in different elections, to provide neat, compact, and strong interchangeable sets or combinations of limiting-locks for the accomplishment of the foregoing, to provide better means for locking the operating belts or covers, to provide a free-ballot mechanism whereby a voter is enabled to vote for an independent candidate or candidates not represented by individual counters in the machine, to provide means for positively locking the machine in all stages, and particularly before and after the counters are exposed to view, to provide means showing the number of times the counters are exposed to view, to provide means to prevent a second opening of the door or slide which conceals the count or record, to provide means to compel a voter to complete his vote for any candidate that he has selected, whereby fraudulent operation of the machine or careless manipulation thereof is prevented, to provide a simple, compact, and positively operated and locked counter or register, and to improve the booth construction and the arrangement of the machine with relation thereto.

A further and particular object of the invention is to lessen the size of the voting-machine and also its weight, whereby the machine is made easy to set up or transport from place to place.

The invention consists generally in a voting-machine of the construction and combination of parts, all as hereinafter described, and particularly pointed out in the claims.

The invention will be more readily understood by reference to the accompanying drawings, forming part of this specification, and in which—

Figure 2:
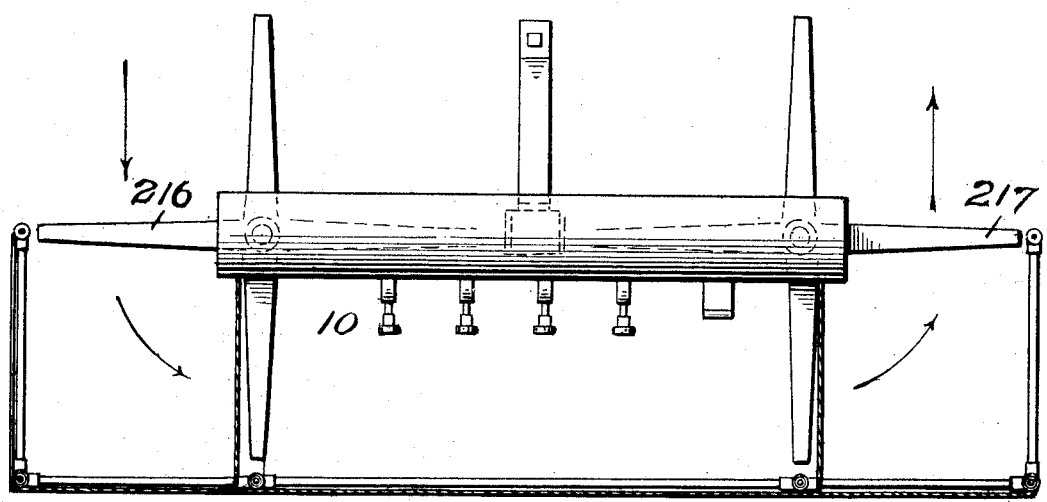
Figure 1A:
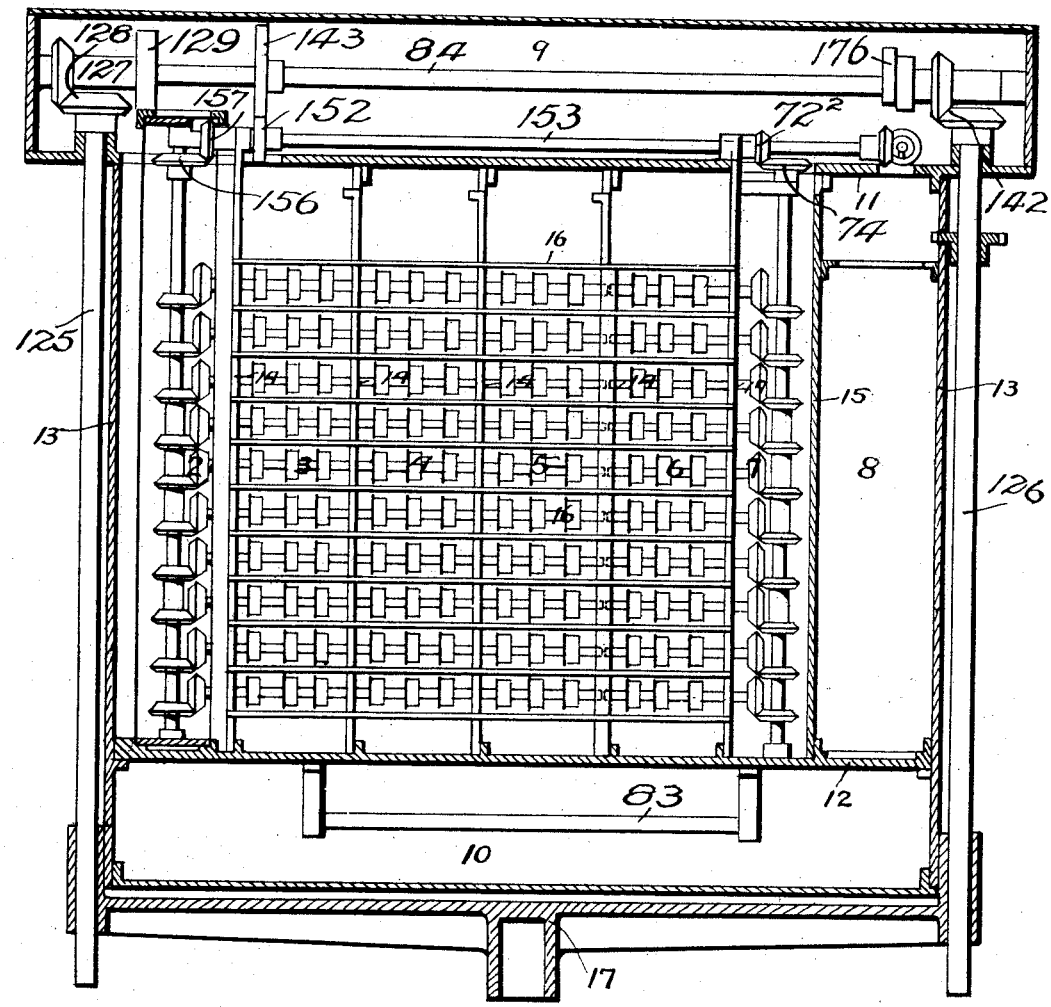

Figure 1 is a front elevation of a voting-machine and booth embodying my invention, the booth or compartment being in section. Fig. 1ª is a vertical section of the frame of the machine. Fig. 2 is a plan view of the same. Fig. 3 is an enlarged vertical section on the line $y\,y$ of Fig. 1, the middle portion of the machine being broken away. Fig. 4 is a similar vertical section on the line $x\,x$ of Fig. 1. Fig. 5 is a similar section on line $z\,z$ of Fig. 1. Fig. 6 is a similar section on line $u\,u$ of Fig. 1. Fig. 7 is a vertical section on line $x\,x$ of Fig. 3. Fig. 8 is a detail view on line $x\,x$ of Fig. 7. Fig. 9 is a detail view on line $n\,n$ of Fig. 7. Fig. 10 is a detail view on line $z\,z$ of Fig. 7. Fig. 11 is a detail view on line $y\,y$ of Fig. 7. Fig. 12 is a plan or horizontal section on line $l\,l$ of Fig. 7. Fig. 13 is a vertical sectional detail on line $x\,x$ of Fig. 12. Fig. 14 is a transverse section on line $y\,y$ of Fig. 12. Fig. 15 is a horizontal section substantially on the lines $m\,m$ of Figs. 7 and 13. Fig. 16 is an enlarged side view of one of the counters or registers on the line $x\,x$ of Fig. 17. Fig. 17 is a plan view of the counter or register. Fig. 18 is a sectional view on the line $y\,y$ of Fig. 17. Fig. 19 is a vertical section on the line $z\,z$ of Fig. 17. Fig. 20 is a section on line $w\,w$ of Fig. 17 viewed from the opposite direction. Fig. 21 is a vertical sectional detail on line $u\,u$ of Fig. 17. Fig. 22 is a vertical section substantially on line $y\,y$ of Fig. 4. Fig. 23 is a vertical section of one of the interchangeable sets or combinations of limiting-locks, being substantially on line $z\,z$ of Fig. 12. Fig. 24 is a perspective view of the notched locking-disks employed upon the main operating-shaft and the main locking-shaft. Fig. 25 is a plan view on line 4 4 of Fig. 23. Fig. 26 is a detail view of the means for operating said locking-shaft. Fig. 27 shows the cam for operating the register which indicates the number of times that the machine has been opened. Fig. 28 is a detail view of the city clerk's lock.

Figure 38:
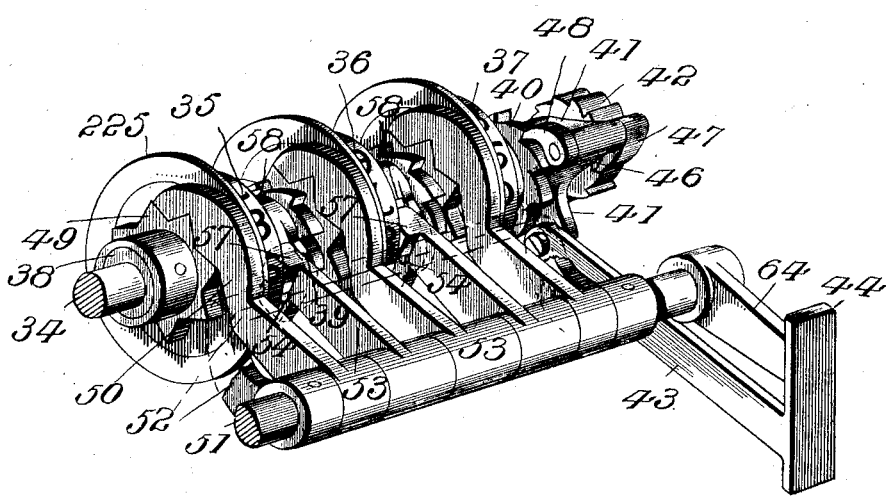
Figure 39:
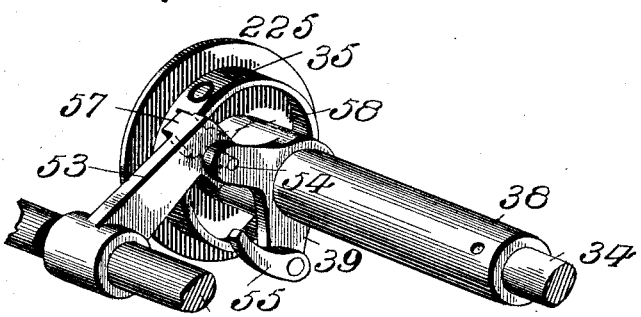
Figure 40:
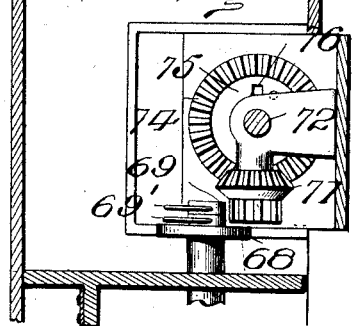
Figure 41:
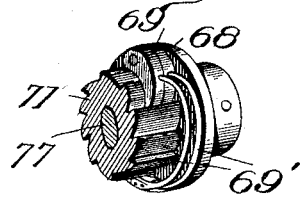

Fig. 29 is an enlarged vertical section of the front of the machine, indicating the preferred arrangement of the cards therein. Fig. 30 is a detail horizontal section of the front of the machine. Fig. 31 shows a section of the face of the machine. Fig. 32 is a vertical section on line $x$ $x$ of Fig. 31. Fig. 33 is a similar view showing means to compel the voter to register his vote before he can again move the push-button. Fig. 34 is a view similar to Fig. 12 and showing the device for locking the exit-turnstile by the belt interlocking device. Fig. 35 is a vertical sectional detail on the line E E of Fig. 34. Fig. 36 is a diagrammatic perspective view showing the interlocking mechanism between the belts and the free-ballot slide or cover. Fig. 37 is a detail of a belt-lock. Fig. 38 is a perspective view of the counter. Fig. 39 is a perspective view of the transfer device of the counter. Fig. 40 is a perspective view of a limiting-shaft clutch. Fig. 41 is an enlarged plan detail of the limiting mechanism or gears.

By reference to Fig. 1 it will be noted that the tickets or different series of parts representing different political parties are arranged vertically. In case of a large number of candidates upon each political ticket it will probably be advisable to extend the tickets or rows horizontally instead of vertically.

The detail construction of the machine will be understood from the following:

*The frame of the machine.*—The frame or casing of the machine has the vertical compartments 2, 3, 4, 5, 6, 7, and 8 and the upper and lower horizontal compartments 9 and 10, the casing being divided by the floors 11 and 12, extending horizontally between the ends 13 of the casing or frame, and divided vertically by partitions 14 between the compartments 2 to 7 and the partition 15 between the compartments 7 and 8. The vertical compartments 3, 4, 5, and 6, which contain the counting mechanisms for the regularly-nominated candidates and for the record of votes upon amendments and questions, are divided by horizontal strips 16, arranged in the forward part thereof and preferably not extending the full depth of the casing.

The casing or frame is preferably arranged upon a yoke or beam 17, which, as shown in Fig. 1, makes a part of a middle or central support 18. There may be as many compartments or columns 3, 4, 5, and 6 as there are regular tickets plus the amendment-column, and, if desired, a separate column for candidates to be voted for by a special class of voters. Before each column 3, 4, 5, 6, and 7 I arrange a preferably removable face-plate or card-frame 19. The construction of one of these card-frames is shown in Figs. 29, 30, and 31. As there shown, the frame 19 is provided with a series of pockets 20, adapted to receive the cards 21, which bear the names of the candidates and the titles of the officers for which they are nominated. These pockets 20 also contain the glass strips 22, which cover and protect the cards 21. The frame, at its upper end, is provided with an edge or lug 23, which projects into a groove 24, provided in the upper portion of the frame or casing. The lower end of the frame is preferably secured by a padlock 25. The fastening for the frame may, however, be in the casing instead of upon the outside thereof. The back of the frame is provided with recesses or grooves 26 to receive the forward edges of the horizontal division strips or bars 16. The pockets each have one closed end 27 and an open end 28, and the open end is closed by the vertical partition 14 that is adjacent to the card-frame. It is evident that the cards and the glasses may be easily inserted into the frames, after which the frames are put in place upon the face of the machine, and thereafter the cards cannot be removed. Preferably at the right hand of each card-frame and between the vertical edge thereof and the next partition 14 there is a slot or way 29, as shown in Fig. 5, to receive the movable belt or cover 30, hereinafter described. On the rear edges of the partitions 14 I provide the rear wall or partition 31, which preferably extends from the floor 11 to the floor 12 and cuts off access to the counting mechanisms that are arranged between the wall 31 and the front of the casing. Back of the partition or wall 31 is a large door 32, which forms the back of the machine, and, as shown in Fig. 12, has a vertical hinge 33 on one end of the casing and adapted to conceal the counters. This door may, if desired, be horizontally hinged, and in any case it effectually prevents access to any of the working parts of the machine. The free-ballot mechanism, which is represented on the face of the machine, will be hereinafter explained.

*The counting mechanism.*—34 34 represent cross-shafts extending through and having bearings in the partitions 14 and whereon the counters are arranged. Counters or registers are provided opposite all of the card-spaces that represent regularly-nominated candidates, and all of the counters in the same horizontal row are arranged upon the same horizontal shaft 34. These counters are preferably constructed as shown in Figs. 16 to 21. In said figures, 35 represents the units-wheel, 36 the tens-wheel, and 37 the hundreds-wheel. A greater number of wheels may be employed, if desired; but these three wheels are capable of showing a total of nine hundred and ninety-nine, which is sufficient for recording the votes in most precincts. The units-wheel 35 is secured upon the sleeve 38, which sleeve is adapted to free rotation upon the shaft 34. The wheels 36 and 37 are adapted to freely rotate about the sleeve or hollow shaft 38. Between the wheels 35 36 and 36 37 I journal the pawl-holders 39, which are adapted to swing freely about the sleeve 38. Adjacent to the wheel 37 and secured upon the sleeve 38 is the ratchet-wheel 40, the movement of which is communicated through the sleeve to the units-wheel 35 and from said wheel to the other wheels.

41 represents an oscillating bell-crank or pawl-carrier journaled upon the shaft 34, and 42 represents a ratchet-wheel the teeth of which extend oppositely to the teeth upon the wheel 40, as indicated in Fig. 16. The ratchet-wheel 42 is secured to the shaft 34, which shaft is rotated for the purpose hereinafter described.

43 represents the counter-actuator, and this device is provided with a broad face or forward end 44, which appears in or opposite the slot in the face of the machine and between the card-holder and the adjacent partition. This broad or high face or end 44 is held and guided between the cross-bars 16, and its rear end is pivotally attached to the oscillating pawl-holder or bell-crank 41. This, as shown in Figs. 16 and 32, is provided with another arm 45, that has a stud 46, projecting from opposite sides thereof, to carry the oppositely-positioned pawls 47 and 48, which respectively engage the ratchet-wheels 42 and 40, so that when the actuator 43 is pushed in by a voter the bell-crank will be oscillated and by its pawl 47 positively move the wheel 42, and hence the shaft 34, while upon the return movement of the actuator the ratchet-wheel 40 and the units-wheel 35 will be rotated one step by the engagement of the pawl 48 therewith.

The wheels 35, 36, and 37 are each provided with figures from "1" to "0," and in connection with each wheel I provide a serrated or star wheel 49, adapted to be engaged by a locking-pawl 50. The locking-pawls for the different wheels are loosely journaled upon a rocking shaft 51, so that when the shaft is rocked toward the counting mechanism the bail 52 will be forcibly lowered upon the locking-pawls 50, which will thus be forced into engagement with the serrated or star wheel 49 upon the figure-wheels of the counter, thereby positively locking each of said wheels against operation in either direction. Upon the same shaft 51 are pivoted the arms 53, the inner ends of which are pivotally connected with the pawl-carriers 39, having a slot 54 and pin 54' connected therewith, as shown in Figs. 19 and 20. Each pawl-carrier 39 is provided with a pawl 55, adapted to engage the ratchet-wheel 56, provided upon the next adjacent figure-wheel 36 or 37. The arm 53 has a laterally-extending lug 57, and the next preceding wheel is provided with a pin 58, that upon the completion of a full revolution of said wheel will engage the projection 57 and raise the arm 53 and therewith the pawl-holder to rotate the next figure-wheel one step. The pin passes out of engagement with the projection 57 during the same movement, and the arm 53 either falls by gravity or is depressed by the bail or yoke 52 when the same is lowered to lock the pawls 50 upon the figure-wheels. In this way the step-by-step movement of the units-wheel is communicated to the tens-wheel and the movement of the tens-wheel is communicated to the hundreds-wheel. The pointer 59 on the shaft 34 and the pin or point 60 on the partition 14 are to facilitate the setting of all the shafts 34 to allow the removal of the locking or limiting devices hereinafter explained.

*The mechanism for resetting the counters and actuators.*—To positively return the counter-actuators, I provide the shaft 51 with an arm 64, preferably a segment having a curved end 65, adapted to engage with some part of the pawl-actuator 43, so that when the shaft 51 is rocked said arm will engage said actuator and return the same to its forward or normal position, thereby turning forward the ratchet-wheel 40 and the units-wheel, as before described. The arm 64 has sufficient lead over the bail 52, and said bail does not engage the locking-pawls until after the full return of the counter-actuator 49 and the full step movement of the ratchet-wheel 40 and the units-wheel, and then only does the bail engage and forcibly return the pawls 50 and 53 to lock the counter-wheels and reset the pawl-carriers 39.

*Simultaneous locking of all counters and actuators.*—As illustrated in Fig. 4 and in other figures, the rocking shafts 51 adjacent to the several counter-shafts 34 extend through all of the partitions 14 and into the first compartment of the casing. On the end of each shaft 51 is an arm 66. All of these arms are connected by a single operating rod or bar 67, which when moved in one direction rocks all of the shafts 51 to return the actuators 43 and lock the counters and when moved in the opposite direction unlocks or liberates all of such parts in readiness for the work of the voter. The mechanism for automatically actuating the rod 67 as the voter enters and leaves the booth is explained hereinafter.

*Vote-limiting mechanism.*—The mechanism for limiting the number of votes that may be cast for candidates for the same office is shown in Figs. 4, 7, 12, 22, 23, and 25. The ends of the cross or counter shafts 34 also extend into the first compartment of the casing, and each shaft is provided with a ratchet-clutch comprising a disk 68, fixed on the shaft and provided with staggered pawls 69, which are held by a spring or springs 69', also upon the disk. These pawls engage ratchet-wheels 70, which wheels for another purpose are made removable from the clutches. The ratchet-wheels 70 are preferably formed with or secured to the gear-pinions 71. The pinions and ratchets are journaled upon short shafts 77 in line with the shafts 72 and are preferably supported by brackets 71'. In engagement with each pinion 71 is a gear-wheel 74, and the pinions and gear-wheels 71 and 74 are preferably beveled gears, in order that all of the wheels 74 may be arranged upon a single shaft 72, said shaft 72 being provided with suitable bearings 72' and preferably extending through the several brackets 71', which support stud-shafts 77. The gear-wheels 74 are journaled upon said shaft 72, and are therefore capable of independent movement, as are also the shafts 34 and the pinion 71, coupled thereto by said clutches. It is obvious that the locking of a gear-wheel 74 against rotation will lock the shaft 34 against rotation in a positive direction, and if this is done the actuators will likewise be locked through the engagement of their pawls with the ratchet-wheels 42 upon the shafts 34. On the other hand, if the wheel 74 is free to rotate then the shaft 34 may rotate until said wheel 74 is locked. It is only necessary, therefore, to limit the rotative movement of each wheel 74 to positively limit the rotation of the shaft 34, and hence positively limit the number of impulses which may be communicated thereto through the counter-actuators. For this purpose I provide the shaft 72 with a pin 76 and provide the gear-wheel 74 with two pins 75 75, which are separated by a space which is proportional to the number of steps or rotative impulses which may be allowed to the related shaft 34. The start is made with the forward pin 75 in engagement with the fixed pin 76 upon the normally-fixed shaft 72, and if the distance between the two pins is such as to allow only such movement as will be communicated to the wheel by the forcing in of a single actuator or key 43 the other pin 75 will engage with the opposite side of the fixed pin 76, and it will thereafter be impossible to further rotate the wheel 74, and hence it will be impossible to force in any other actuators which are opposite to or belong to the shaft 34, that is connected to said gear 74.

As the shaft 34 represents all of the candidates upon the different political tickets and for a single office, it is evident that but one candidate can be voted for, after which the mechanisms representing the other candidates will be locked. Should it be desired to permit voting for more than one candidate from a single set of candidates upon different political tickets and represented by the same shaft 34, then the pins 75 75 would be separated by a distance proportional to the number of votes to be allowed.

*The limiting mechanism for multicandidate groups.*—If two or more series, sets, or tiers of counting mechanisms are required to represent the candidates upon the different political tickets for offices or positions upon a board, committee, assembly, or the like, it is necessary to adapt such mechanisms to what is known as "selective" or "multicandidate" voting, while limiting the number of mechanisms which may be operated when selected from the group or several rows of devices. To permit selective or multicandidate voting, I positively connect the shafts 34 of the required number of tiers or rows of counting mechanisms. This is done by securing all of the gear-wheels 74 belonging to said shafts 34 upon a single sleeve or shaft 74'', which sleeve is journaled upon the shaft 72. Now an impulse imparted to either of the shafts, or a series of impulses imparted to one thereof, through the operation of different actuators connected therewith will cause the simultaneous rotation or movement of all of the limiting gear-wheels 74 which are thus connected by the sleeve 74''. This common movement of the gear-wheels does not affect the other shaft 34, owing to the employment of the ratchet-wheels 70 and the ratchet-clutches upon the shaft 34. Now to limit the number of impulses which may be imparted to one or to the different shafts 34 it is only necessary to provide one of the wheels 74 of the group with pins 75 75 to engage a fixed pin upon the shaft 72. These pins 75 75 are separated by a distance proportional to the number of votes allowed to a voter for the candidates included in the group, and therefore the wheel 74 will be stopped after a certain movement thereof and will consequently lock all of the shafts 34 and all of the actuators which have remained in their normal positions. By this simple device I am enabled to group together any number of tiers or rows of counting mechanisms. A group of four and a group of two are illustrated in Fig. 23, and Fig. 25 shows the positions of the pins 75 75 upon the upper wheel or disk 74 of the group of four.

The resetting of the limiting locks or wheels 74 is accomplished by turning the shaft 72 until the pins 76 thereon will engage with the forward pin 75 upon the different wheels, such movement—or, as I prefer, a complete rotation of the shaft 72—being permitted by the ratchet-clutches between the wheels 74 and shafts 34. The means for clearing or resetting the locks will be explained hereinafter.

*The adaptation of the voting-machine for use in different elections.*—The number of votes allowed a voter is dependent upon the construction of the locking or limiting devices—to wit, the wheels 74 and the stop-pins thereon. These I prefer to make interchangeable, and in order to adapt the machine for use in different elections where different combinations of candidates are to be voted for I preferably arrange the shaft 72 and all of the parts connected therewith in a separate frame which is removable from the main frame or casing of the machine. This feature of my invention is illustrated in Figs. 7, 12, 23, and 25. As shown, the frame or plate 73 carries the bearing 72' of the shaft 72 and also carries the intermediate bearings or brackets 71', in which the studs 77 are arranged. This frame is held in suitable guides in the main frame or casing of the machine and is adapted for movement in a plane parallel with the faces of the disks 68, so that when the pawls upon said disk are properly placed (they are located by the pointers 59 and the pin 60 of the shafts 34) the frame and the limiting and ratchet wheels may be withdrawn from the compartment of the casing. This removable frame is secured to the main frame of the machine by a suitable lock, preferably a padlock 73″. (Shown in Figs 12 and 23.)

Several removable frames and sets of locks or limiting devices are furnished with the machine, the different sets being adapted for use in different elections—that is, the limiting devices are permanently constructed and connected in the different wheels 73′—so that to change a machine for use in another election it is only necessary to remove the set of limiting-locks and insert another set and then properly arrange the candidates' cards upon the face of the machine. I am thus enabled by a slight modification to adapt a single machine for different uses, and there can be no possible mistake in the arrangement of the groups of counting devices or in the number of votes allowed a single voter, all of these arrangements being made and provided for by the manufacturers before the machine leaves them and all manipulations by careless mechanics or by intent are avoided.

*Means to prevent casting more than one vote at a time.*—To prevent the casting of more than one vote at a time upon any one ticket or row of devices representing a political party, I prefer to employ a belt 80 in connection with each row of devices representing a political ticket and also in connection with the amendment column or row of devices. These belts 80 operate over pulleys 81 and 82, which are arranged upon the shafts 83 and 84 in the upper and lower compartments or parts of the casing. These shafts have suitable bearings in the ends of the casing, and the wheels or pulleys are loosely journaled thereon and are kept in position by fixed collars 85 on said shafts. The rear parts of the belts preferably operate between the rear partition and the door 32 of the casing. The forward parts or stretchers of the belts operate in guides or slides that are formed between the edges of adjacent card-frames 27, which have projecting flanges 87 to protect the edges of the belts. The belts may bear against the forward edges of the horizontal bars 16, and it is unnecessary to provide continuous bearings for the inner sides of the belts, although, as shown in Fig. 30, each belt preferably laps upon and is additionally guided by the forward edge of the adjacent partition 14. These belts are of metal and prevent access to the counter-actuators 43, which are beneath or back of the same, and said parts are as effectually locked as though they were separately engaged by positive bolts. For operating one of the actuators at a time I provide each belt with an opening in its forward side or stretch, through which opening the voter may reach the actuator. He may, if desired, operate the actuator with his finger; but I prefer to provide a knob or key on the belt for this purpose, particularly as certain results can be accomplished thereby which could not be insured if the voter was allowed to operate the actuator by hand. This knob, key, or button upon the belt is preferably arranged in or upon the small bracket or box 89, that is attached to the belt by suitable means. The stem 90 of the key or button 88 extends through the single hole 91 in the belt. The portion of the belt at the hole is preferably reinforced to form a slight bearing for the inner end of the stem 90 of the button. The construction of the push-key and its bracket will be understood by reference to Figs. 31, 32, and 33. As shown in Fig. 32, I preferably provide a small annunciator 93 in connection with the push button or key. This annunciator is a plate bearing a suitable mark, (see Fig. 31,) which will show through an opening 94 in the face of the box or bracket 89, the plate being arranged upon a lever pivoted within the box and actuated by a spring 93′ and also actuated by a bell-crank lever $93^2$, attached to the stem of the key, so that when the key is returned to its outer position the lever 93′ will be moved to place the blank portion of the plate 93 before the hole 94. When the lever 93′ is thus raised, the small catch $93^3$ will spring beneath the same and will thus lock the annunciator in its upper position, and its catch $93^3$ is only disengaged from the lever 93′ when the plunger has been forced nearly to the limit of its inward stroke.

95 represents the spring which returns the button when it is released.

To prevent an incomplete or ineffectual vote—that is, a partial actuation of a counter by a partial inward movement of the key or button—I preferably provide the key or button with means which lock the same in any intermediate position and are only freed from the key or button at the end of the inward stroke of the same. This mechanism is shown in Fig. 33 and comprises a series of ratchet-teeth 90′ upon the stem of the key or button to be engaged by a pawl 96, which pawl is pivoted upon a stationary pin 96′. On the same pin is pivoted a short lever $96^2$, adapted to engage a limiting-pin $96^3$. A spring $96^4$ presses the pawl into engagement with the ratchet-teeth 90′. On the stem 90 I provide a pin $90^2$, that upon the inward movement of the stem will at the limit of the inward stroke thereof engage with the lever $96^2$, and a lug $96^5$ thereon will throw the pawl 96 out of engagement with the ratchet 90′, so that the stem may return to its outer position. To prevent the immediate return of the pawl 96 to the rack, I provide a latch 97, preferably in the form of a bell-crank, pivoted within the bracket or box 89 and having an arm to be struck by the pin $90^2$ and having its other arm provided with a hook to engage the lever $96^2$ when said lever is thrown away from the pin $96^3$ by the movement of the stem. A single spring 97′ serves for both the lever $96^2$ and the lever 97, and when the hook upon the latter part engages the lever $96^2$ it will be held in such position until the pin $90^2$ again engages with the catch or lever 97, whereupon the hook thereon will be withdrawn from the lever 96², so that the pawl 96 may drop back into engagement with the ratchet-teeth upon the stem. In this manner the pawl is held out until the stem has fully returned. The lever 96² may be made to perform the function of the catch 93³. (Shown in Fig. 32.) It will be evident from the foregoing that it will be necessary for a voter to push the key clear in and that the key can only be liberated and returned after the pawl in connection with the actuator has engaged with the ratchet-wheel of the units-counter.

The inner end of the stem 90 is preferably wedge-shaped, as shown in Fig. 32, and the stem is of much less diameter than the distance between adjacent cross bars or strips 16, so that it is not necessary to accurately lock or position the key opposite any particular actuator, as the key may be pushed in at any point between the two narrow bars 16 above and below the actuator, and if it strikes upon such a partition 16 will slip or slide therefrom and strike an actuator upon one side or the other thereof. It is evident that as all of the inner keys or actuators 43 are covered and concealed by the belts there is no part thereof which the voter can take hold of, and there is no temptation for a voter to attempt to pull out a key, as upon other voting-machines which have a key for each counting mechanism. The actuators really pass out of the control of the voter when they are once pushed in, and it is not even possible to exert a pressure thereon which would be detrimental to the structure.

*Means to prevent voting upon more than one ticket at a time.*—To prevent the casting of ballots upon more than one ticket at a time, I provide means whereby upon the movement of either one of the belts all of the other belts are locked. This mechanism is shown in Figs. 3, 6, 7, 12, 13, and 14. The same comprises a flexible belt 100, extending transversely across or through the top of the machine and having one end 101 permanently attached to the frame. The other end is held in a movable spring-rod 102, which by a spring 103 holds the belt or strap 100 under tension. The rod 102 is arranged in bearings 104, wherein it is adapted to slide, and upon its end is a lug or arm 105, adapted to be engaged by a suitable locking device, preferably a crank-arm 106, arranged in the end of the casing and adapted to be secured by a padlock 107 upon the exterior thereof. The key for this padlock is held by the election judge, and the padlock is only removed when the polls open, at which time the crank or lock 106 swings out of engagement with the belt-rod 102, and thereafter the belt may be flexed. The belt is confined in notches 108 in the rear side or edges of the vertical partitions 14 and is held therein by suitable rollers 109, and the slack of the belt is limited by a suitable stop (see Fig. 12) for the rod 102. On each partition are guides for belt-flexing plungers 110. (Best shown in Figs. 12 and 14.) These plungers are operated by the movements of respective belts, and with a limited slack in the belt 100 it is possible for but one to be moved at a time, so that but one belt may be operated at a time. The connection between the main belts or movable covers for the actuators and the plungers 110, which operate upon the belt 100, is made as follows: Each plunger is provided with a pin 111, that is engaged by a spring 112, arranged upon the rocking block 113, which has another arm 114. The latter is adapted to be engaged by a sector 115, which is freely revoluble upon a shaft or stud 116, which has an oppositely-extending pointed arm 117, that normally bears against the inner side of the rear stretch 118 of the belt 80 or projects through a hole 119 therein. Now when either belt is moved by reason of its push-key upon the forward stretch thereof the arm 117 will be caught by the downwardly-moving rear stretch of the belt, and the sector 115 will be upwardly rotated, striking against the arm 114 and forcing the same back into the dotted position shown in Fig. 14. If this is the first belt 80 to be operated, the plunger belonging thereto will be thrown by the spring 112, which moves with the arm 114, and the belt 100 will be flexed, as indicated by dotted lines in Fig. 12. The continued movement of the belt 80 will invert the sector 115 and its arm 117, and thereafter the arm 117 will simply trail or bear upon the inner side of the belt. Meantime the sector will remain in engagement with the arm 114 and hold the plunger in its forward position to take up the slack in the belt 100. When the belt 80 is returned, the arm 117 will naturally drop into the hole thereof and the sector will be downwardly rotated to free the arm 114 and allow the return of the plunger. Their return is accomplished by the pressure of the belt 100, that is under tension of the spring 103. Now if during the time that the arm 114 is rocked back by its corresponding sector 115 an attempt is made to move one of the other belts 80 said belt 80 can only be operated to slightly depress the arm 117 and sector belonging thereto, and while the arm 114 thereof will be forced back the spring 112, connected therewith, will yield against the pin 111, upon the plunger, and hence the plunger will not be projected, the strength of the belt 100 being greater than that of the spring 112. Thus the plunger will be left in the path of the sector 115, which will engage therewith, and thus positively prevent any further depression of the arm 117, that projects through the belt, and so the belt is positively locked against movement. The belt 100 which I employ is a very light metal band, or other material may be employed, and the belt may be very delicate and flexible, as but little pressure is ever exerted thereon, owing to the employment of the intermediate springs 112. Obviously after the return of a belt to its normal position either of the other belts may be operated and the initial movement thereof will lock the other belts. It is unnecessary to provide any locking means in connection with the belt which belongs to the amendment-column.

It will be obvious from the foregoing that voting will be permitted on but one ticket or upon but one row of devices, which row is covered by such a movable belt. It is obvious that the movable belts or covers 80 could be extended crosswise of the several tiers instead of being arranged one for each ticket, and, further, it will be evident, as a voter is only permitted to cast one vote at a time upon any ticket and is compelled to properly locate the key or push opposite a selected actuator before he can vote at all, that the voter is compelled to exercise care in balloting and confusion is avoided. This, taken in connection with the means for preventing an incomplete vote or ballot, insures the proper registering of the intended ballots of the voter.

*Means for automatically locking the counters and returning the actuators.*—As before explained, the counter-actuating devices and the counter-actuator-returning devices are all arranged upon the shafts 51, the arms 66 of which are connected by a common bar 67. This rod or bar 67 is operated by a connection with the cam 120 upon the upper horizontal shaft 84 of the machine. This connection comprises a link 121 and a cam strip or yoke 122, that is pivoted to a lug 123 on the casing, as shown in Fig. 4. The cam is adapted to be operated first by the entrance-turnstile to depress the bar 67, and thus unlock the counters, and is thereafter operated another half-revolution by the exit-turnstile (see Fig. 1) to lock the counters and return the actuators by rocking the shafts 51, connected with said bar 67. The half-revolutions required of the cam 120 are accomplished in connection with the means employed to so lock the entrance-turnstile that it cannot be more than once operated until the exit-turnstile has been operated. Said turnstiles 216 and 217 are here simply considered as the means for locking and unlocking the machine. Their relations to the booth proper will be explained hereinafter.

*The means operating the locking-cam and interlocking the turnstiles.*—The turnstiles 216 and 217 are arranged upon the lower ends of the vertical shafts 125 and 126, which have bearings upon or within the ends of the casing; but these turnstiles are operated successively by the voter in entering and departing from the booth. The interlocking devices are preferably arranged on the shaft 84. As shown in Fig. 7, the shaft 125 is connected with the sleeve 127 by beveled gears 128, and the sleeve 127 is operatively connected with the cam-sleeve 124 through the medium of the mechanisms shown in Figs. 7, 10, and 11 and whereby the cam 120 is given a half-rotation when the entrance-shaft 125 is rotated. This mechanism comprises a ratchet-wheel 129 on the sleeve 127 and engaged by a fixed pawl 130 to prevent backward rotation thereof. This prevents the voter from going out of the booth by way of the entrance-turnstile. On the side of the ratchet-wheel 129 is a pawl 131, having a shoulder 132 in engagement with a cam 133, that is fixed upon the shaft 84. The cam is circular, except for a flat side 135 thereon, and so long as the pawl 131 is in engagement with the flat side of this cam the ratchet-wheel may be rotated freely. The pawl is held in engagement with the cam by a spring 136, and there is a double cam or ratchet 137 on the cam-sleeve 124, and this is engaged by a pawl 138 on the ratchet-wheel 129 and held by the spring 136. Opposite or in the path of the pawl 131 are two fixed stops 139 and 140, with which the pawl 131 is adapted to engage when it is forced out by being rotated away from the flat side of the cam 133 or by the rotation of said cam. At the end of the first half movement or rotation the pawl 131 will have been projected outward and will engage with the stop 140, while the pawl 138 will have engaged the ratchet 137 and rotated the same and the cam 120 to unlock the counter-actuators and counters by throwing down the rod 67. These conditions are shown in Figs. 7 and 10. To unlock the entrance-turnstile and to lock the counters and the counter-actuators, I employ the movement of the exit-turnstile operating through the shaft 126 and the shaft 84. Said shaft 126 is connected to the shaft 84 by beveled gears 142, and at a point near the cam-sleeve 124 the shaft 84 is provided with a gear-wheel 143, which bears a pawl 144, adapted to engage a double ratchet or cam 145, that moves with the cam 120. Therefore as the exit-shaft 126 is revolved the cam 120 will be returned to its original position, thereby locking all of the counters and returning the counter-actuators in the manner before explained. This movement of the sleeve 124 rotates the cam 137 to a new point of engagement with the pawl 138, and therefore does not affect the forward moving connection of the sleeve 127 and the sleeve 124; but the movement of the shaft 84 rotates the cam 133, which is attached thereto, and carries the flat side thereof opposite to the pawl 131, which is then in the position shown in Fig. 10, and immediately said pawl will be forced in by its spring and will be disengaged from the stop 140, thereby unlocking the entrance-turnstile. The next half-revolution of the entrance-turnstile will carry the pawl 131 onto the high part of the cam 133, and the end of the pawl 131 will engage the upper end or side of the stop 139, thus again locking the entrance-turnstile until, as before described, it is a second time unlocked by the operation of the exit-turnstile.

It will be understood from the foregoing that the counter-actuators and the counters are only free to be operated after the exit door or turnstile has been opened and the entrance-turnstile afterward actuated to unlock the counters. It will further be understood, if one of the push-keys or operators upon a belt happens to be left partly pushed in and is therefore locked by its ratchet, that it will be impossible to operate the counter-actuator-returning mechanism, and therefore the exit-turnstile will be locked. Hence a voter must return the push-keys and leave the machine in proper shape before he can get out of the booth. The rotation of the exit-turnstile in more than one direction is prevented by the engagement of the fixed pawl 150 with a ratchet-wheel 151, arranged upon the shaft 84. The movement of the exit-turnstile is also employed through the medium of the gear 143 to reset the "group" or "multicandidate" and the single limiting or locking devices. The shaft 72, belonging to the set of limiting devices, is driven from said wheel 143. 152 is a pinion, preferably of half the size of the gear 143 and arranged upon a cross-shaft 153, which shaft is connected with the shaft 72 by beveled gear-wheels 154 and 156. The gear 154 is preferably made removable with the shaft 72, being connected to the shaft 153 by a ratchet-clutch 157.

*Amendments and questions mechanism.*—The means for recording votes upon amendments or questions that are submitted to the voters for approval or disapproval will be understood by reference to Figs. 1, 7, and 12. As indicated in Fig. 1, each question or amendment is preferably stated in two places on the front of the machine, distinct "yes" and "no" propositions being presented to the voter. Within the machine and opposite each space within the amendment-compartment I provide counters identical with those before described as being employed for regularly-nominated candidates. A belt 80 with a single push or key is provided for the amendment-column and the voting upon amendments is the same as voting for candidates, with one exception—to wit, that each pair of counters representing "yes" and "no" votes are provided with but a single limiting device, so that but one vote may be cast. The limiting devices are arranged in the vertical compartments 7 and are each adapted for one step. Otherwise they are identical with the limiting or locking devices before explained and are arranged upon a similar shaft 72, which shaft, however, may have permanent bearings, as it need never be removed from the machine. There are returning-pins upon the shaft 72, and said shaft is rotated to return the limiting-stops upon the gear-wheels by means of a beveled-gear connection 72" between the same and the cross-shaft 153.

*The free-ballot mechanism.*—This portion of the machine is arranged in the compartment 8, and the front wall of said compartment is provided with a number of horizontal slots 160. (See Fig. 13.) These slots are normally closed by a slide 161, which is movable in guides 162 upon the face of the machine and is provided with a suitable handle or knob 163, by which it may be drawn down to open the slots or writing-spaces 160. Opposite each slot or space 160 I arrange a paper-carrying mechanism. All of these mechanisms are, as shown in Fig. 7, preferably arranged in a single frame or slide 165, that is held in suitable guides in the walls of its compartment 8. Suitable means are provided for locking this frame in place, so that it cannot be removed except by an authorized person. The frame may be of any suitable construction, and in it are bearings for the shafts 166 and 167. There are also four shafts 168 for the small corner-rollers, and these are preferably fixed in the frame, said rolls revolving freely thereon. The shaft 166 is at its upper end provided with the ratchet-clutch 170, engaged with the ratchet-wheel 171, (see Fig. 7,) from which it may be readily released to allow the removal of the frame 165 and to permit the movement of said shaft 166 in one direction only, except when the pawls of the clutch are lifted when rewinding the strips of paper, as described below. The ratchet-wheel 171 and the roll 169 on the shaft 166 are adapted to be driven in one direction by the rack-bar 172, which engages the pinion 173 upon the short shaft 174. This operates on the wheel 171 through the beveled gears 175. A short bearing is provided for the shaft 174, as shown in Fig. 5. The return movement only of the rack is employed to rotate the rolls 169, and as this requires some power and must be done automatically I arrange a cam 176 on the shaft 84 and adapted to operate a yoke or lever 177, which as it rises engages with the hook 178 upon the upper end of the rack-bar 172, thereby drawing up said rack-bar and the slide 161 and rotating the spools or rolls 169, thereby withdrawing the paper from the rolls of paper previously placed upon the shaft 167, all as shown in Figs. 5 and 15. In the front of the frame which carries the spools I provide one or a series of plates 177, across which the paper travels and which takes the pressure of the pencil or other device in the hands of the voter. After the voting has been finished and the polls closed and when the record of the votes is being taken from the machine the paper strips may be rewound upon the shaft 167 by means of a suitable key and a key-rod 179, suitably connected to the shaft 167 at the time the pawls 170 of the clutch device 171 are lifted to allow the backward rotation of the shaft 166.

To prevent the recording of more figures or names upon the paper by the judges or other persons while the rewinding is taking place, I preferably protect the rear side of the free-ballot frame by a glass plate 180, and, further, preferably divide each space by a series of narrow bars 181, so that it would be impossible to insert a pencil for the purpose of writing further names upon any of the free-ballot strips. The paper strips are of greater width than the slots 160, and to prevent a voter from rendering the free-ballot portion of the machine inoperative by cutting the paper strip and thereby weakening the same, so that it would be liable to break when a tension was placed thereon in turning the winding-drum 166, I preferably strengthen the paper strip of each free-ballot device by employing a cloth or thin metal strip 167' beneath each paper strip, and this strip also is of greater width than the slot, so that if even an entire piece was cut out of the paper and cloth the strip would still feed forward when drawn by the winding-roll.

*The interlocking of the free-ballot slide and the regular tickets.*—When the free-ballot slide is operated, it is desirable to immediately lock the belts 80, which represent the regular tickets, and for this purpose I provide an interlocking mechanism in connection with the flexible belt or strap 100. The part of the mechanism which I prefer to use is shown in Figs. 7, 12, and 13. It comprises a simple pivoted lever 182, provided with a shouldered end 183, which when the slide is depressed drops back into the dotted-line position shown in Fig. 13, while the opposite end 184 of the lever moves down into the path of the arm 105' upon the rod 102, thereby locking the belt 100 in its taut or stretched position, so that none of the plungers 110 belonging to the belts 80 can be thrown back to allow the passage or movement of a belt. On the other hand, it is equally desirable to lock the free-ballot mechanism if a voter elects to select his candidates from the regular tickets, and for this purpose I provide the bell-crank or three-pronged lever 185, pivoted upon the frame of the machine and having a depending arm adapted to snap in under an inwardly-projecting lug 187 upon the free-ballot slide 161. This is prevented by the flexing of the belts 100 by the operation of a plunger 110, which draws the arm 105' on the rod out of the way of the upper arm of the bell-crank 185, thereby allowing the same to rise and permit the other arm to engage the lug 187. Thereafter it will be impossible to draw down the slide.

As a means to return the locking parts just described, I provide a short shaft 188, operated by bevel-gears from the cross-shaft 153 when the exit-turnstile is turned and having an arm 189, adapted to strike both the part 185 and the part 182 to free the same from the slide or the flexing-belt, and thus reinstate all of the interlocking devices.

*The locking of the machine when the records are exposed.*—Before the judges of election or other persons are permitted to view the counters and the free-ballot slips such parts should be positively locked against further manipulation. The mechanism employed for this purpose is illustrated in Figs. 4, 7, and 22. I prefer to employ the door 32, which conceals all of the counters and records, as a means to operate the locking mechanism, whereby the machine is rendered inoperative when the door is open, and to insure the absolute locking of the machine before the door is actually opened I prefer to arrange the locking devices in connection with and to be operated by the lock belonging to the door. The door 32 has the door latch or lock 190, adapted to be turned by means of a suitable knob or handle upon the outside of the machine and preferably on the door-frame, though it may be carried by the door. The latch 190 is adapted to engage the door, or if upon the door to engage the frame, and to it I attach a rod 192, which extends upwardly and is connected with a ratchet mechanism preferably comprising a pivoted lever 193, having a pawl 194 to engage with and actuate a ratchet-wheel 195, which in turn operates a suitable lock. The preferred form of lock comprises a wheel 197, mounted upon the shaft which carries the ratchet-wheel 195. (See Figs. 4 and 24.) This wheel 197 is provided with a notch 198, and the wheel is set perpendicularly to a similar wheel 199, arranged upon the shaft 84 or upon the sleeve thereon and provided with a notch 200. When the notches in the two wheels register or stand opposite, either one of the wheels may be turned freely; but it is evident that if either wheel is turned out of this position the other wheel will be securely locked against rotation. The wheels register after the exit-turnstile has been operated and the counters and counter-actuators and the free-ballot slide are in a locked condition. Therefore when the latch 190 is lifted to unlock the door 34 the wheel 197 will be partially rotated to carry a solid portion of the wheel through the notch in the wheel 199 upon the main shaft 84 of the machine. As these parts are all concealed in the upper part of the machine and are not accessible to any person and as the wheel 197 can rotate in but one direction, the operating parts of the machine will be positively locked against operation by a voter who attempts to operate the actuators and cannot be unlocked by the rotation of the turnstiles, which are themselves locked by the interlocking devices before described and which are associated with said shaft 84, the sleeve thereon, and the notched wheel 199. If these operations are completed simultaneously with the movement of the door-latch, the door may be opened for the purpose of taking the records from the counters or registers and from the free-ballot mechanism.

*The city clerk's lock.*—It is of course necessary to provide means whereby the machine after being so locked by the election judge in opening the door may be unlocked for the purpose of returning the counters and putting the machine into condition for another election. I therefore provide a lock in connection with the aforesaid locking mechanism, and the key of this lock is held by the city clerk or other person who has the supervision of the returns. This part of the mechanism is shown in Figs. 4 and 28, wherein it will be seen that the shaft 196 is provided with a limiting or locking device similar to the devices shown in connection with the counter-shafts 34. In this case the shaft rotates and the disk which carries the stop-pins is held stationary. The shaft 196 has the pin 201, which preferably rotates in an opening or space 202, provided in the upper part of the casing or frame, and this opening is closed by the disk 203, which carries the stop-pins 205 and is normally held by a padlock 206, which secures it to the frame of the machine, and the key is held by the city clerk or a court officer. The disk is, however, revoluble on the end of the shaft 196, but cannot be removed therefrom owing to a head or collar 204 on the outer end of the shaft. The opening of the door rotates the pin on the shaft against the forward pin 205, extending from the inner side of the disk 203, and the shaft cannot be further rotated. Hence after the door has been once opened by the judge he may close the same and lock it by means of the latch; but after so locking it he cannot again open the door, as the door is locked through the medium of the ratchet-wheel and pawl in connection with said shaft 196 and the door-latch; but to allow the opening of the machine, which is necessary when it is desired to reinstate all of the parts preparatory to another election, the city clerk or other officer may remove the padlock or other lock 206 of the disk, and by simply turning the disk to carry the rear stop-pin 205 thereon against the pin upon the shaft will allow the further rotation of the shaft and permit the unlocking of the door. The city clerk's lock is so left until all the counters of the machine have been turned back to zero, and the padlock is then replaced on the disk 203. To facilitate the turning back of the counters, I preferably provide each of the counter-wheels with a knurl 225, and these flanges or knurls project through the rear partition of the machine, so that they may be operated by hand. As the door can only be opened when the counters are locked, as before explained, and as the movement of the turnstiles controls the unlocking of the counters when the machine is in proper condition for voting, it is evident that there is no time when the machine is open or subject to unlimited manipulation.

In addition to the precaution of providing means for locking the machine after the counters have been exposed to view I preferably provide the further safeguard of a register 207 in connection with the door and the city clerk's lock to show how many times the door has been opened and how many times the city clerk has operated his lock. The register is shown in Figs. 4 and 7. It is substantially identical with the other counters, but preferably has only two counting-wheels, as a greater number is not required. This register 207 is preferably arranged in the upper part of the machine and is provided with an arm 208, adapted to be actuated by the lever 209, which in turn is operated by the cam-lever 210, engaged with the cam 211 upon the shaft 196. Each operation of the city clerk's lock or of the door will be recorded on the register 207, so that an unauthorized release of the voting mechanisms to restore them to working order may be detected by any one by comparing the several records from the register or counter 207. Similarly I preferably provide a counter or register 212 in connection with the free-ballot slide, as shown in Figs. 7 and 12. The counting-wheels are the same as before described and are operated from the parallel shaft, which in this case is extended to an arm 213, having a connection 214 with the free-ballot slide 116, so that each operation of said slide will move the counter 212 one step, and the return of the slide will by means of the usual bail lock said counter against manipulation when the door is opened.

*The construction and arrangement of the booth.*—I may, if desired, provide a catch between the exit-turnstile and the railing of the booth proper, which catch is under the control of the voter, these being to prevent the operation of the turnstile by a voter upon the outside of the booth, which would lock the machine to a voter within the booth. Furthermore, it may be desirable to arrange this lock in such a manner that it is automatically operated by the return of the free-ballot slide or of the belts, so that these parts must be restored by a voter before he can leave the booth. I do not consider this requisite to the satisfactory operation of the voting-machine, but in Figs. 34 and 35, which should be read in connection with Figs. 1 to 12, I have shown a mechanism for accomplishing this result. When the belt 100 is flexed by the movement of one of the locking belts or covers 80, the spring-rod 102 will be drawn back, as shown in Fig. 34. On the shaft 126 of the exit-turnstile there is a notched cam or disk 126', which operates through the side of the casing and is engaged by a pawl 106', pivoted within the casing and held by a spring 106''. The end of this pawl or lever is in position to be engaged by the end of the rod 102 when it is projected, at which time the pawl will be disengaged from the disk 126'; but when the rod is drawn back by the flexing of the part 100 the pawl 106' will be allowed to drop into the notch of the disk 126' and will lock the same and prevent the turning of the turnstile until the belt 80 and the belt-band 100 are returned by the action of the voter. Thus the voter is prevented from leaving the booth until he has restored all parts of the machine to their normal positions.

The Operation of the Machine.

*Its normal condition.*—The normal condition of the machine is as follows: The shaft 84 is in such position that the wheel 199 thereon has its notch registering with the notch in the wheel 197 belonging to the city clerk's lock, and the shaft may therefore rotate freely. The entrance-turnstile is unlocked ready for the entrance of the voter, as the pawl 131, which is associated with the shaft 84, is out of engagement with the fixed stop 139, while the exit-turnstile is locked to a voter attempting to enter the booth by way of it, owing to the engagement of the fixed pawl 150 with the ratchet-wheel 151 upon the shaft 84. The normal position of the rod 67 and of the cam 120, connected therewith, is the raised position shown in Fig. 4, and the locking parts upon the shafts 51 are in engagement with the counters and the counter-actuators, as they appear in Fig. 3. At the same time the free-ballot slide is held in its upper position by the engagement of the upper end 178 of the rack-bar with the cam-lever 177, which lever at this time is in the position shown in Fig. 5.

*Preparation of the machine for voting.*—When a voter enters a booth through the entrance-turnstile, the shaft 84 is rotated halfway through its connection with the shaft 125 of the entrance-turnstile. This movement carries the cam of the lever 177 downward, thereby depressing said lever and releasing the free-ballot-slide rack-bar, so that the voter may draw down the free-ballot slide if he so desires when he arrives before the machine. At the same time the cam 120 on the shaft 84 is turned downward, and thereby the bar 67, connected with said cam, is dropped, thus rocking the bails 52 and the arms 64 out of engagement with the counter-locking pawls and with the counter-actuators, respectively. Thus the voting mechanisms which represent regularly-nominated candidates and also those representing amendments to be voted on are liberated for use by the voter. Simultaneously with the movements of the above mechanisms the wheel 129 in rotating carries the pawl 131 thereof around the then stationary cam 133 on the shaft 84, and said cam is projected and engages with the fixed stop 140, as shown in Fig. 10, thereby preventing further operation of the entrance-turnstile by another voter.

*The voting operations.*—After the machine is thus placed in readiness for voting, as above described, the voter elects whether he will or will not employ the free ballot. If he elects to vote a scratch ticket—that is, vote for candidates not regularly represented upon the machine—he draws down the free-ballot slide and thereby through the mechanism hereinbefore described automatically locks the movable belts belonging to the regular tickets and does not lock the amendment-column. The locking mechanism operated at this time is the flexible belt 100 and the parts connected therewith. When the free-ballot slide is drawn down, the voter will be compelled to write not only the name of the particular person whom he wishes to have elected to a certain office and who is not represented upon the regular tickets, but he will also be compelled to transcribe from the cards of the regular tickets the names of the regular candidates for whom he wishes to vote. This condition is present in the machine shown in the drawings hereof; but it is not necessary to follow this plan, as by a simple mechanism means may be provided to allow a voter to enter one free ballot without having to copy the names of regular candidates upon the free-ballot slips. Independent slides for the free-ballot slots would be employed for this purpose, and these slides would preferably be used in connection with an additional belt which would prevent the opening of more than one slot at a time, if such precaution was thought advisable. If a voter disregards the free-ballot mechanism, he will then take hold of one of the knobs or pushes belonging to one of the belts and will lift the same, thereby moving the belt, and in this initial movement will through the belt-locking mechanism, which includes the belt 100, lock the other movable belts upon the face of the machine and will also lock the free-ballot slide. The free-ballot slide will thereafter remain locked, as it is held by a positive catch, yet when the voter returns the knob which he has employed he may then lift or move either of the other knobs and its belt, having locked the knob or key opposite the card of the candidate for whom he wishes to vote, and presses the knob inward. The knob will be locked by the ratchet device shown in Fig. 33 and cannot be withdrawn by him or be returned until the inward movement of the knob is completed. At the completion of the inward stroke of the push or key the annunciator will show above the knob and indicate that the vote has been cast. When the inner end or point of the push-key strikes the face or end of a counter-actuator, said actuator will be forced inwardly and will thereby lock the pawl-holder attached thereto, and thus rotate the limiting-shaft 54 to move the limiting stop or gears 74 one step. This is the action of the counter-actuators, and the counters themselves are preferably not operated until the voter passes out of the booth, and this locks the exit-turnstile. When the exit-turnstile is operated, the shaft 84 will be rotated and will raise the bar 67, thus rocking the shafts 51 and moving the short arms 64 into engagement with the counter-actuators to return the same to their forward positions. Now as the pawl-holders 45, having the pawls 47 to engage the ratchets on the shafts 34, also have pawls 48 to engage the oppositely-toothed ratchets connected with the units-wheels of the counters, the return of the counter-actuators will lock the pawl-holders and thereby move the units-wheels of the counters forward one step. When the units-wheel has been moved nine steps, the next movement thereof will carry the pin 62 upon the units-wheel into contact with the short lever 53, and said arm or lever will be raised and will thereby lift the pawl-holder 39, which carries the pawl 15, engaging the tens-wheel of the counter. (See Fig.

20.) At the completion of the tenth step of the units-wheel the tens-wheel will have been moved one step and the pin upon the units-wheel will have left contact with the short arm or lever 53. Said arm or lever will then be returned by gravity or will be struck down by the locking-bail, which is automatically caused to engage therewith and with the star-wheel pawls 50 immediately after the pin on the units-wheel has left the arm 53. The rocking of the bail is accomplished by the lifting of the cam 120 when the exit-turnstile is moved. The movement of the hundreds-wheel is accomplished in like manner. The cam 120 is positively rotated by the movement of the turnstile through the medium of the shaft 84 and the ratchet-and-pawl connection thereof with the said cam.

*The limiting devices.*—If there is but one limiting-wheel 74 geared to a particular counter-shaft 34 and said wheel has its stop separated by a distance allowing only one step movement of the shaft 34, then evidently only one actuator connected with said shaft 34 may be operated, as thereafter said shaft will be locked against rotation by the limiting device or wheel 74, and the other actuators are locked by the pawls which engage the then stationary ratchet-wheels on the shaft 34. On the other hand, if two or more shafts are connected by wheels 74, as shown in Fig. 23, and said wheels are permitted to move several steps, as hereinafter described, then the said shafts 34, or either of them, will permit the operation of just as many actuators as there are steps permitted by the limiting devices or wheels 74, and after the number is filled then both or all of the connected shafts 34 and the actuators which remain unoperated will be positively locked. This is the operation of a multi-candidate group of voting mechanisms. As before explained, the instant that the counting-wheels have been fully rotated or moved to record a single added vote the locking-bails 52 will descend upon the locking pawls or arms 50, which are thus forced into engagement with the star or serrated wheels upon the counting-wheels, and said wheels will thus be positively locked against operation in either direction by a force exerted directly thereon—as, for example, through the rear partition of the machine. Simultaneously with the descent of the locking-bails 52 the shafts 72 and 72' belonging to the limiting devices of the regular tickets and the amendment-column will be positively rotated through a partial or a complete revolution, the movement thereof being greater than the greatest distance between any of the stops upon the limiting or locking wheels 74. This is accomplished through the cross-shaft 153, actuated by the exit-turnstile through the medium of the shaft 84. Also the rotation of the shaft 153 through bevel-gears actuates the short shaft 188 to free the latches of the free-ballot slide and of the flexible belt 100, and at the same time the rotation of the shaft 84 will, through the cam 176 and cam-lever 177, operate to raise the rack-bar 172 and the free-ballot slide after said slide and bar have been previously depressed by the voter, and in this case the forcible return of the rack-bar will, through the keys engaged therewith, rotate the shaft 166 of the free-ballot mechanism, and thereby advance all of the paper strips of said mechanism.

*The operations and conditions after the polls are closed.*—When the polls are closed and the last voter has passed from the booth, the counters and all voting mechanisms will be in a positively-locked condition. Then the election officers will in the presence of all persons in the polling-station open the door upon the back of the machine and will thus expose the counters and registers to view and will transcribe the results of the election upon a suitable return-sheet, rewinding the free-ballot slips by means of a suitable key or crank, as before described. The judge or other person cannot in any manner affect or change the true result of the election by moving any of the counters or by writing upon the free-ballot slips, for previously to the opening of the door all of said parts have been positively locked through the operation of the latch for the door and the city-clerk lock, which includes the notched disk 195. After the returns have been taken from the machine the judge will close the door and throw down the latch thereof, after which the door cannot be again opened, except after the city clerk has unlocked the machine, and as this is not done until just before the succeeding election all evidence necessary for use in the trial of contest cases of election is preserved in an absolutely accurate form, and it will only be necessary to produce the machine before the trial judges or committee to settle all questions relating to the count. A marked advantage of my machine is that in case it is necessary for a judge to enter a booth to assist an ignorant voter or eject an unruly one then the movement of the turnstiles will operate to automatically return all of the counter-actuators and the annunciators, so that it will be impossible for the judge to ascertain the previous vote of the person in the booth. It is evident that by means of a simple locking-bar provided in connection with all of the belts the movement of the belts may be limited to a given throw or to a given number of counting devices, thereby readily adapting the machine for class voting, and it is also evident that straight-ticket voting may be provided for either by the employment of an extra set or row of counters and the automatic rotation of all of the shafts 34 or by distinct means connecting the counters throughout the ticket. Such a mechanism and one adapted for use in this machine is described and claimed in my pending application herein referred to.

It is obvious that my invention admits of various modifications that will readily be suggested hereby to one skilled in the art, and I therefore do not confine my invention to the specific constructions herein shown and described.

Having thus described my invention, I claim as new and desire to secure by Letters Patent—

1. A voting-machine, made up of voting mechanisms, including counters, in combination with a booth having its entrance and exit openings at opposite ends of the said machine, and said machine forming the front of said booth and provided with a door upon said front which being opened exposes the counters, whereby the count may be obtained or learned without entering the booth, substantially as described.

2. In a voting-machine, the combination of the frame or casing containing voting mechanisms or counters representing the various candidates and for operation by a voter, with a central standard or support 18, whereon said casing is arranged, a suitable booth having a back and sides, said machine forming the front of said booth, and having on its outer side a door upon the opening of which the counters of the machine are visible from without the booth the turnstiles 216 and 217 provided upon opposite ends of said casing and beneath the same and revoluble upon opposite sides of said standard 18, said turnstiles controlling the operation of said voting mechanisms by a voter, and interlocking means between said turnstiles, substantially as described.

3. In a voting-machine, the combination of the frame or casing divided into distinct compartments by suitable partitions, voting mechanisms arranged in certain of said compartments and a limiting or grouping mechanism inserted in another of said compartments, suitable means operatively connecting said voting mechanisms and said limiting or grouping mechanisms, and permitting the removal of said limiting mechanism as a whole from its compartment without disturbing or altering said voting mechanisms, and means for securing said voting mechanisms against operation when it is desired to remove said limiting mechanism, substantially as described.

4. The combination, in a voting-machine, of voting mechanisms, with a shaft or shafts having connections for positively locking said voting mechanisms, and a movable door or turnstile operably connected to said shaft, whereby the counters are alternately locked and unlocked, substantially as described.

5. The combination, in a voting-machine, of the frame containing voting mechanisms, with the controlling and operating shafts 125 and 126, arranged vertically upon the ends of said frame, the turnstiles 216 and 217 provided on the lower ends of said shafts and revoluble beneath said frame and the central mast or standard 18 supporting said frame, substantially as described.

6. The combination, in a voting-machine, of the frame, with the rows of counters representing the different political tickets and normally concealed, and means upon said frame for simultaneously exposing said counters and locking the same, substantially as described.

7. The combination, in a voting-machine, of a frame, with rows of voting mechanisms therein, a door or like part concealing all of said voting mechanisms and having means adapted to compel the locking of said mechanisms before it may be opened, substantially as described.

8. The combination, in a voting-machine, of a frame, with rows of voting mechanisms therein, a door concealing all of said voting mechanisms and adapted to compel the locking of said mechanisms before it may be opened, and means preventing a second exposure of said devices, substantially as described.

9. The combination, in a voting-machine, of a frame, with rows of voting mechanisms therein, a door concealing all of said voting mechanisms and adapted to compel the locking of said mechanisms before it may be opened, means preventing a second exposure of said devices by an election officer, and means under the control of a special officer for unlocking said door and registering such operation, substantially as described.

10. In a voting-machine, the combination, of the frame, with the voting mechanisms therein, a concealing-door on said frame, and automatic means whereby said door having been once opened and again locked is permanently locked against operation by an election officer, substantially as described.

11. In a voting-machine, the combination, of the frame, with a record-concealing door, a latch therefor, and automatic means permitting one operation of said latch and locking the same thereafter, substantially as described.

12. The combination, in a voting-machine, of the frame containing the voting mechanisms, with a record-concealing door or movable part, and an automatic lock in connection with said door for securing the same after it is once opened and closed, substantially as described.

13. The combination, in a voting-machine, of the frame containing the voting mechanisms, with a record-concealing movable door or part, an automatic limiting-lock in connection with the door, and a locking mechanism for the voting mechanisms and whereon the door-lock is dependent, substantially as described.

14. The combination, in a voting-machine, of the frame, the counters therein, counter-operating means, a part normally concealing said counters and adapted to be moved to expose the same, said part being upon said frame, and means positively limiting the number of movements of said part by the election officers, substantially as described.

15. The combination, of a booth or voting-chamber with a voting-machine forming a part thereof, and on its exterior provided with a part concealing the counters of said machine, and a mechanism preventing the operation of said part except when the booth is closed, substantially as described.

16. The combination, in a voting-machine, of a frame having a door, with means for holding the same in a closed position, and a distinct locking mechanism actuated by said holding means and locking the door after it has been once opened, substantially as described.

17. A voting-machine comprising a frame and voting mechanisms, in combination with interchangeable card-holding frames forming the face of the machine, and means upon the frame locking one end of each card-frame, and locks securing the opposite ends of said frames, substantially as described.

18. The combination, in a voting-machine, of the frame, with voting mechanisms provided therein, movable covers for said voting mechanisms, operating parts thereon, and removable card-frames between which guides are formed for said movable covers, said parts together concealing the voting mechanisms, substantially as described.

19. A card-frame, in combination with the main frame of a voting-machine, and having open-ended card-pockets, and means forming parts of said frame and closing said pockets when said frames are placed upon said main frame, substantially as described.

20. The combination, with the frame of a voting-machine, with removable frames, each having a series of card-holders, and means upon said frame of the machine locking the cards therein when said removable frames are in place, substantially as described.

21. The combination, in a voting-machine, of the main frame, with the card-frames, and means locking the same in said main frame, said card-frames each provided with card-pockets, and cards and card-covers provided in said pockets and locked therein by the locking of said card-frame in said main frame, substantially as described.

22. The combination, in a voting-machine, of the frame containing voting mechanisms, strips 16 separating the different mechanisms, a movable belt or cover having a voting-mechanism operator, and guides which with said strips prevent the pushing in of said cover or belt, substantially as described.

23. The combination, in a voting-machine, of the frame divided into vertical and horizontal compartments, the shafts in the upper and lower compartments, the belts operating over pulleys on said shafts in the upper and lower compartments, and the voting mechanisms and limiting devices respectively locked and actuated from one of the last-named shafts, substantially as described.

24. The combination, in a voting-machine, of a counter including transfer devices with an actuator for operating the units-wheel of said counter, and independently-operating means whereby the transfer devices are operated and the counter positively locked after its operation by said actuator the counter is positively locked after its operation by said actuator, substantially as described.

25. The combination, with a counter-wheel, of a star-wheel movable therewith, means for actuating said counter-wheel, a pawl for said star-wheel by the weight of which said star-wheel and said counter-wheel are held against movement except when positively actuated, said pawl operating to justify the counter-wheel, and means for automatically locking said pawl to lock said counter-wheel against movement in either direction, substantially as described.

26. In a voting-machine, the combination, of a series of counters, with a shaft whereon the same are mounted, means for operating said shaft and said counters, and a limiting device in connection with said shaft preventing the operation of more than a certain number of said counters by one voter, substantially as described.

27. In a voting-machine, the combination, with a series of counters, of a shaft revoluble with respect to said counters, actuators for operating said counters and said shaft, and a limiting device in connection with said shaft preventing the operation of more than a given number of said counters by one voter, substantially as described.

28. The combination, in a voting-machine, of the counting mechanism with a movable actuator therefor to be operated by a voter, positively-actuated means for returning said actuator after it has been operated by a voter, a locking mechanism for said counting mechanism and said positively-actuated means having a continued movement after the return of the actuator to operate said locking mechanism, substantially as described.

29. In a voting-machine, the combination, of an actuator to be operated by the voter, with a returning mechanism, said mechanism being normally engaged to lock said actuator in its normal position, operating means for disengaging said mechanism to permit the movement of the actuator, and a counter mechanism in mechanical connection with said actuator, substantially as described.

30. The combination, of a counter, with an actuator having a connection therewith and adapted for full-stroke movement in one direction by a voter, means securing said counter against movement by said actuator when operated by a voter, and positive returning mechanism to return said actuator and move said counter through the connection thereof with the actuator, substantially as described.

31. The combination, with a counter, of an actuator for movement by a voter, automatic actuator-returning and counter-locking means by the former of which the movement of the counter is accomplished, and operating means for disengaging said returning means from said actuator and disengaging said automatic locking means from said counter to permit the operation of the actuator by a voter, substantially as described.

32. The combination, in a voting-machine, of a counter, with a counter-actuator, which latter, under operation by a voter, moves without moving said counter, and means for returning said actuator and thereby moving the counter and positively-actuated means locking the counter after its operation, substantially as described.

33. The combination, in a voting-machine, of a counter, with an actuator capable of movement in one direction independently of said counter and operating said counter when moved in the opposite direction, and the rocking shaft having parts for accomplishing such opposite or return movement of the actuator, substantially as described.

34. The combination, in a voting-machine, of two or more counters each having a plurality of counter-wheels, with the means for operating said counters, a rocking shaft, counter-wheel-locking pawls and said shaft having an arm or bail for each of said counters to engage the pawls thereof to lock the individual wheels of said counters, substantially as described.

35. The combination, in a voting-machine, of a counting mechanism, with an actuator therefor, a positively-operated rocking shaft, and means thereon adapted to engage said actuator for positively returning and locking said actuator, substantially as described.

36. The combination, in a counter, of two or more counting-wheels, with a locking-pawl for each, an actuator, a rocking shaft, and means thereon for engaging and returning said actuator, and operating said pawls, substantially as described.

37. The combination, in a voting-machine, of the counter, with the actuator therefor, means concealing said counter, positive means for returning the actuator and locking the same upon the movement of the concealing device to expose said counter.

38. The combination, of the counter, with the actuator, locking means operable upon said counter, means concealing said counter, and automatic means compelling the return of said actuator and the locking of said counter before said concealing means may be moved.

39. The combination, of the counter, with the actuator, locking means operable upon said counter, means concealing said counter, means for returning said actuator and engaging said locking means, and means whereby the exposure of said counter is prevented until after the operation of said means operable upon said actuator and locking means, substantially as described.

40. The combination, of the counter, with the actuator, the counter-locking pawl or lever, the locking-shaft operable upon said actuator and pawl, the counter-concealing means, the mechanism compelling the locking of said actuator, and said actuator upon or prior to the exposure of the counter and means operating upon said mechanism preventing a further operation thereof, whereby the entire mechanism is rendered inoperative after or upon the exposure or taking of the record from said counter, substantially as described.

41. The combination, in a voting-machine, of a counting-wheel, a shaft whereon said wheel is mounted, a limiting device in connection with said shaft, and means connecting said actuator with said shaft and said wheel for the successive operation thereof, substantially as described.

42. The combination, in a voting-machine, of a counter, with a shaft whereon said counter is mounted, a limiting device operated by said shaft, an actuator having connections with said shaft and said counter, and locking devices automatically operated to operate said actuator and lock said counter, substantially as described.

43. The combination, of a counter device, comprising two or more wheels, a shaft whereon the same are mounted, an actuator operatively connected with one of said wheels, transfer devices provided between said wheels, and an automatically-operated locking mechanism adapted to successively return said actuator, operate said transfer devices and lock said wheels, substantially as described.

44. In a voting-machine, the combination, with two or more counting-wheels, of an actuator connected with one of the same, transfer means between said wheels, a shaft whereon said wheels are carried and which is also operated by said actuator, and a movement-limiting device in connection with said shaft, substantially as described.

45. The combination, of two or more independent counters, with a shaft whereon the same are arranged, an actuator for operating each counter, said shaft being operable by either of said actuators, and a limiting mechanism in connection with said shaft, substantially as described.

46. The combination, in a voting-machine, of a shaft adapted to a limited movement, with actuators for so moving the same, a counter for each actuator, said counters being arranged upon the said shaft, and means for returning said actuators and releasing said shaft, substantially as described.

47. The combination, of a shaft adapted to a limited rotation with two or more counters arranged thereon, suitable actuators, oppositely-arranged operable devices connecting said actuators with said shaft and respective counting mechanisms, and positively-operated automatic means for moving said actuators in one direction and for releasing said shaft, substantially as described.

48. The combination, of two or more counters, with a shaft whereon the same are arranged, a limiting device in connection with said shaft, actuators for said shaft and counters, means for moving said actuators and locking all of said counters, and a mechanism operating to reset said limiting device, substantially as described.

49. The combination, of two or more counters, with a shaft whereon the same are arranged, a limiting device in connection with said shaft and hence common to all said counters, and whereby the operation of more than a certain number of counters is prevented and common means for locking said counting mechanisms, substantially as described.

50. The combination, with a shaft, of actuators whereby said shaft is moved, suitable counters, the operation of which is controlled by said shaft, a limiting device in connection with said shaft, and means for resetting said limiting device without movement of said shaft, substantially as described.

51. The combination, in a voting-machine, of a manual actuator adapted for movement in both directions by a voter and forming a permanent part of the machine with a counter, and positively-actuated means independent of the manual actuator for advancing said counter after the return operation of said actuator by a voter, substantially as described.

52. The combination, in a voting-machine, of two or more counters, with common means for limiting the operation thereof to a given number, and common locking means for positively and simultaneously locking said counters after the operation thereof, substantially as described.

53. In a voting-machine, the combination, of a series of counters, with the shaft revoluble with respect to said counters, and in one direction only, actuators for operating said counters and said shaft, a limiting device in connection with said shaft preventing the operation of more than a given number of said counters by one voter, and means for resetting said limiting device without moving said shaft, substantially as described.

54. The combination, in a voting-machine, of a counter, with an actuator, a pawl-holder provided in connection with said actuator, a limiting-shaft, and oppositely-arranged ratchet-wheels in connection with said shaft and said counter to be engaged and operated by the pawls upon said pawl-holder, and means for returning said actuator, substantially as described.

55. The combination, in a voting-machine, of a counter, with a limiting device, and a reciprocating actuator having a positive mechanical connection with said counter and said limiting device for the positive movement thereof in opposite directions, and a moving part to return said actuator, substantially as described.

56. The combination, in a voting-machine, of a counter, with a movable limiting device, a reciprocating actuator having a limited movement and having positive connections with said limiting device and with said counter, and positively operated for the successive and complete operation thereof in reverse directions during the respective movements of said actuator, substantially as described.

57. In a voting-machine, the combination, of a counter, with an actuator, counter-actuating means set or arranged by the operation of said actuator, means for moving said counter-actuating means, and means for successively locking said actuator and said counter, substantially as described.

58. In a voting-machine, the combination, of an actuator for operation in one direction by a voter to indicate his ballot, with a counter adapted to be operated by the return movement of said actuator, and means for returning said actuator and locking the same and immediately thereafter locking said counter, substantially as described.

59. In a voting-machine, the combination, with two or more counters, of means for operating the same, a limiting device in connection with the same, and an indicator in connection with said limiting device to facilitate the adjustment or changing thereof, substantially as described.

60. In a voting-machine, the combination, of the counter-limiting shaft, with a removable limiting device permitted to be removed only when said shaft is in a given position, and an indicator in connection with said shaft for facilitating the adjustment or changing of said device, as and for the purpose specified.

61. In a voting-machine, the combination, with the body of the machine, of counter-actuators and counters provided therein, locking devices, an exterior counter-operating means, and means permitting the locking of said counters only after the restoration of said exterior operating means or device, substantially as described.

62. In a voting-machine, the combination, of the counter-actuators and the counters, with automatic locking means operable thereon, a movable manual operator, and means permitting the locking of said actuators and counters only after the return of said operator to a normal position, substantially as described.

63. In a voting-machine, the combination, with a series of counters, of a shaft whereon the same are arranged, counter-actuators, and means in connection with said shaft for simultaneously locking said counters and said actuators against operation, substantially as described.

64. In a voting-machine, the combination, with a series of counters representing candidates in different political parties, with a shaft whereon said counters are arranged, and means in connection with said shaft for limiting the number of counters thereon which it is possible for one voter to operate, substantially as described.

65. In a voting-machine, the combination, with a counting mechanism, of transfer means between the parts thereof, locks for the parts of the counters, and independently-movable means comprising a part of the locks for the operation of said transfer means, substantially as described.

66. In a voting-machine, the combination, of a counter, with transfer means between the parts thereof, locks for said parts of the counters, and exterior means for the return of said transfer means and the locking of said parts, substantially as described.

67. The combination, in a counting mechanism, of a limiting-shaft with a sleeve thereon, a units-wheel attached to said sleeve, another wheel journaled on said shaft and operated from said units-wheel by a transfer mechanism, and an actuator operable both on said shaft and said sleeve, substantially as described.

68. The combination, in a voting-machine, of the shaft, with the limiting device in connection therewith, a sleeve revoluble about said shaft and bearing a units-counter, other counters journaled on said sleeve, a carrier journaled on said shaft and carrying oppositely-extending parts in engagement with said sleeve and said shaft, voting means for moving said carrier, and said carrier being adapted to move only when said shaft and the limiting device are free, as and for the purpose specified.

69. The combination, in a voting-machine, of shafts with limiting means at the ends thereof, counters provided upon each shaft for the candidates for the same office in different political parties, and the counters for candidates in the same political party being arranged upon different shafts, substantially as described.

70. The combination, in a voting-machine, of the shafts with limiting means provided at the ends of said shafts, counters provided upon each shaft for similar candidates in different political parties, the counters for candidates in the same political party being arranged upon different shafts, and an actuator provided for each counter and operative thereon and upon its shaft when permitted to move by the limiting means connected thereto, substantially as described.

71. The combination, of the counting mechanism, with locking-pawls therefor, a rocking shaft, the actuator connected with said counting mechanism, said rocking shaft having an arm or segment to engage and return said actuator and also provided with an arm or bail to engage said locking-pawls, substantially as described.

72. The combination, of the units-wheel of the counter, with a ratchet connected therewith, a pivoted pawl-carrier, a counter-actuator, a limiting-shaft provided with a ratchet, and said pivoted pawl-carrier provided with oppositely-working pawls in engagement with said ratchet, whereby the movement of the actuator in one direction sets the pawl of the counter and the return of the actuator operates said counter, substantially as described.

73. In a voting-machine, the combination, of counters with a series of counter-actuators, a shaft arranged opposite the same and provided with a ratchet-wheel for each actuator, said wheels being secured upon said shaft and each adapted to be operated by its actuator, and a limiting device of a rotary character arranged perpendicularly to said shaft, substantially as described.

74. In a voting-machine, the combination, of a series of counter-actuators, with counters, a shaft arranged opposite said actuators and provided with a ratchet-wheel for each actuator, said wheels being secured upon said shaft and each adapted to be operated by its actuator, and a limiting device of a rotary character arranged upon an axis perpendicular to said shaft and being readily detachable from said shaft, substantially as described.

75. In a voting-machine, the combination, of a number of parallel shafts with counters arranged thereon, means in connection with said shaft limiting the operation of said counters, actuators for said counters, counter-locking devices, actuator-returning means, and means common to all of said locking and returning devices for operating the same simultaneously, substantially as described.

76. In a voting-machine, the combination, of a plurality of series of counters, with locking-shafts independent of said counters, and means for operating said locking-shafts to successively operate and secure said counters as the voter departs from the booth wherein said parts are arranged, substantially as described.

77. In a voting-machine, the combination, of a series of counters, with counter-actuators, means for setting said counters by said actuators, means for rotating or moving the counters that have been set and for afterward locking the same by the movement of the voter away therefrom, as from a booth, substantially as described.

78. In a voting-machine, the combination, with a series of counting mechanisms, and their actuators, of a limiting mechanism operated thereby and positively and only operated in one direction by successive voters in their operation of the machine, substantially as described.

79. In a voting-machine, the combination, of a limiting-shaft, with a series of counters located thereon, counter-actuators actuating the same, and a limiting mechanism positively moved by the voter through the medium of one of the actuators and said shaft, substantially as described.

80. In a voting-machine, the combination, of a series of one-direction-impulse devices and counters, with actuators, and limiting mechanism having positive gear connections with said impulse devices, substantially as described.

81. In a voting-machine, the combination, of a series of counters, with a limiting-shaft, actuators for positively operating said shaft and counters, and a one-direction limiting device geared to said shaft and hence positively operated by the actuators, substantially as described.

82. In a voting-machine, the combination, of a limiting-shaft capable of movement in one direction only, with two or more counters, actuators connected to said shaft and to respective counters, a limiting device connected with said shaft and also capable of movement in one direction only, and means for stopping or limiting the movement of said limiting device, substantially as described.

83. In a voting-machine, the combination, of a limiting-shaft capable of movement in one direction only, with two or more counters, actuators for operating said shaft and counters, a limiting device connected with said shaft and also capable of movement in one direction only, means for limiting the movement of said limiting device, and said limiting device being connected with said shaft by a suitable clutch, whereby said limiting device may be readily removed and replaced by another, substantially as described.

84. In a voting-machine, the combination, with two or more limiting-shafts, with counters, actuators for the respective shafts and counters, limiting means connecting said shafts, and positive means for returning said actuators and advancing the limiting means without moving said shafts, substantially as described.

85. In a voting-machine, the combination, of two or more limiting-shafts, with a series of counters for each shaft, counter-actuators operable upon respective shafts and counters, limiting means connecting said shafts, interposed clutch or separable devices whereby resetting of said limiting means is permitted without the movement of said shafts, substantially as described.

86. In a voting-machine, the combination, of two or more limiting-shafts and the means for operating the same, with connected limiting-gears, a stop for said gears, said gears being connected with respective shafts in such a manner that the movement of said gears from one of said shafts is not communicated to the other shaft or shafts, substantially as described.

87. In a voting-machine, the combination, with two or more shafts, of a limiting mechanism capable of actuation by either of said shafts, and devices connecting said shafts and allowing the same to move independent of one another, as and for the purpose specified.

88. In a voting-machine, the combination of two or more shafts with counter-actuators, a limiting mechanism connected with said shafts for movement by either thereof but incapable of communicating movement to either of said shafts, and adapted for ready removal or detachment therefrom, substantially as described.

89. In a voting-machine, the combination, with the limiting-shaft capable of rotation in one direction only, of a series of counters, actuators for operating said counters, the operations of which are governed by said shaft wherewith the actuators are connected, a limiting disk or gear having a ratchet-clutch connecting with said shaft for rotation in one direction thereby, and capable of independent rotation in the same direction, stop means and positively-actuated means for resetting said stop means, substantially as described.

90. In a voting-machine, the combination, with the limiting-shaft and means for actuating the same, of the limiting disks or gears, one-way-movement devices interposed between said shafts and said limiting disks or gears connecting the same, but permitting independent movements of said shafts and means for liberating or advancing said stop mechanism, substantially as described.

91. In a voting-machine, the combination, of the limiting-shaft and means for actuating the same, with the limiting disks or gears, ratchet-clutch connections between said gears and said shafts, a stop mechanism in connection with said gears, means for liberating said stop mechanism, and means for rotating said stop mechanism to reset the same, substantially as described.

92. In a voting-machine, the combination, of two or more limiting-shafts and means under the control of the voter for operating the same, with a limiting disk or gear for each shaft and capable of being moved in one direction only thereby, a stop mechanism in connection with said disks or gears, means for rotating said stop mechanism to move forward said gears and reset the same, and means allowing the movement of the disks or gears independently of the said shafts, substantially as described.

93. In a voting-machine, the combination, with two or more limiting-shafts and means for imparting impulses or movement thereto, of counters controlled by said limiting-shafts, and means arranged at the ends of said shafts for limiting the number of impulses which may be communicated to said shafts and the number of counters that may be operated, substantially as described.

94. In a voting-machine, the combination, with two or more limiting-shafts, of counters controlled thereby, and a limiting mechanism connected with each of said shafts and adapted to be moved in one direction by either of the same, and connections between said limiting device and said shafts allowing the movement of the latter by said shafts, but preventing the movement of one shaft by another, substantially as described.

95. In a voting-machine, the combination, with two or more limiting-shafts and counters controlled thereby, of a gear-wheel connected with each shaft, means connecting said gear-wheels for common movement, and the connections of said gear-wheels with said shafts permitting the independent movement thereof in one direction, substantially as described.

96. In a voting-machine, the combination, with a limiting-shaft and counters controlled thereby, of a disk connected with said shaft by a suitable ratchet or clutch mechanism, stop-pins upon said disk, and a normally stationary stop to be engaged by said pins, and means for rotating said normally stationary stop to return said disk to its original position independently of said limiting-shaft, substantially as described.

97. In a voting-machine, the combination, with two or more limiting-shafts and the counters depending thereon for their operation, of two or more disks having a common axis and suitably connected, and each having a ratchet-clutch connection with a limiting-shaft, stop-pins upon said disks, and a normally-fixed stop to be engaged thereby, substantially as described.

98. The combination, in a limiting mechanism for voting-machines, of a shaft provided with a stop-pin and means for rotating the shaft, with two or more gears provided upon said shaft and suitably connected to rotate thereon, one thereof having stop-pins to engage the pin upon said shaft, and independent means in connection with each gear for transmitting an impulse or movement to all of the same, substantially as described.

99. In a voting-machine, the combination, with two or more sets or rows of counters, and a limiting-shaft for each row, of a limiting-disk for and having a connection with the shaft of each row or series of said counters, the limiting-disks being connected, common stop means in connection therewith, and said shafts being incapable of communicating movement to one another, as and for the purpose specified.

100. In a voting-machine, the combination of two or more rows of counters and means for setting the same, with a limiting-shaft for each row, and operated when a counter belonging thereto is set, and a limiting mechanism for each shaft, and means for moving the counter after the movement of said shaft, substantially as described.

101. In a voting-machine, the combination, with two or more rows of counters and means for setting the same, of a limiting-shaft for each row and operated when a counter thereon is set, a limiting mechanism connected with each shaft by means communicating the movement thereof in one direction to said limiting mechanisms, all of said limiting means being connected for simultaneous movement, and a suitable stop mechanism, and means for moving or advancing the counters after the movement of their shafts, substantially as described.

102. In a voting-machine, the combination, with the limiting-shafts, of the rows of counters associated therewith, a limiting mechanism common to all of said shafts and comprising stops and gears positively connected to said shafts for movement thereby in one direction, said gears being capable of being moved in the same direction independently of said shafts without affecting said shafts, substantially as described.

103. In a voting-machine, the combination, of two or more rows of counting mechanisms and their limiting-shafts, with a limiting mechanism common to all of said shafts and comprising gears positively connected thereto for movement thereby in one direction, said gears being capable of movement in the same direction independently of said shafts without affecting said shafts, an intermittently-operative stop mechanism, and said gears being connected for common operation upon said stop mechanism, substantially as described.

104. In a voting-machine, the combination, with two or more limiting-shafts, of a gear-wheel for each having ratchet connections therewith, means connecting the gears for common movement, and a stop device common to said gears and capable of a limited movement in the same direction to reset said gears, substantially as described.

105. In a voting-machine, the combination, with two or more limiting-shafts, of gears connected therewith, a stop-shaft perpendicular to said limiting-shafts and whereon said gears are journaled, a fixed stop upon said stop-shaft, and permanent stops upon said gears to engage the fixed stop, and said shaft and gears being readily removable for interchange, substantially as described.

106. In a voting-machine, the combination, with two or more limiting-shafts, of gears connected therewith, a stop-shaft perpendicular to said limiting-shafts and whereon said gears are journaled, a fixed stop upon said stop-shaft, stops upon said gears to engage the fixed stop, and said gears being secured upon a sleeve journaled upon said shaft for simultaneous movement, substantially as described.

107. In a voting-machine, the combination, with two or more limiting-shafts, of a stop-shaft perpendicular thereto and having a sleeve journaled upon it, a gear fixed upon said sleeve, one for each of said limiting-shafts, said gears having ratchet connections with respective limiting-shafts, stop-pins upon said gears, and means for rotating the stop-shaft whereon the gears are arranged to reset said gears irrespective of said limiting-shafts, substantially as described.

108. In a voting-machine, the combination, with a series of parallel limiting-shafts and the counters in connection therewith, with interchangeable limiting devices operated by the voter and arranged at the ends of said shafts upon a common shaft, removable therewith, as described.

109. In a voting-machine, the combination, with two or more tiers of counters, of a limiting mechanism operated upon by the voter arranged at the ends of said tiers and interchangeable as and only as a whole with re- 110. In a voting-machine, the combination, with two or more tiers of counters, of a limiting mechanism arranged perpendicularly to said tiers and removable, as described, locking means for said counters and means compelling the locking of said counters before the removal of said limiting mechanism, substantially as described.

111. In a voting-machine, the combination, with two or more tiers of counters, of a removable mechanism arranged at the end of said tiers and having readily-detachable independent connections therewith, serving to communicate movement or impulses to said mechanism and permitting the removal or detachment of said mechanism as and only as a whole from said tiers for the insertion of another for another election, substantially as described.

112. In a voting-machine, the combination, with two or more tiers of devices containing the counters for candidates in different political parties, said tiers being arranged singly and in groups, of a limiting mechanism parallel with the counters belonging to the same political party and connected with all of said tiers to control the number of movements of the counters therein by the same voter, substantially as described.

113. In a voting-machine, the combination, with two or more tiers or rows of voting mechanisms representing a multicandidate group, of a limiting mechanism, an auxiliary limiting mechanism for each row and means for resetting said limiting mechanism without a positive operation of any of the voting mechanisms except those for which the auxiliary mechanisms have been actuated by the voter, substantially as described.

114. In a voting-machine, the combination, with the limiting-shaft, of a series of counters arranged thereon, an actuator for each counter and having a connection with said shaft, and means for limiting the movement of said shaft to a given number of impulses and thereby positively locking the actuators which have remained unoperated, substantially as described.

115. In a voting-machine, the combination, with a series of counters of a relatively-removable limiting device, and means securing said limiting device whereby the same cannot be removed until the counters are exposed to view and locked, substantially as described.

116. In a voting-machine, the combination, with the series of counters, with a removable or detachable limiting device, and means securing said limiting device, so that the same cannot be removed until the counters are locked against operation, substantially as described.

117. In a voting-machine, the combination, with a suitable casing or frame, of a number of counters provided therein, a mechanism for limiting the operation of said counters and arranged within said casing, means securing the same therein, and means concealing said limiting device and said counters, and means whereby upon the exposure of said limiting device and said counters, said counters are locked against operation, substantially as described.

118. In a voting-machine, the combination, with a number of counters, of a frame or casing containing the same, and a limiting mechanism removably connected with said counters and arranged within said casing or frame, means concealing the same and which cannot be removed until said counters are exposed to view and are locked against further operation, substantially as described.

119. In a voting-machine, the combination, with a series of counters, of means for locking the same against operation when they are exposed to view, a limiting mechanism removably connected with said counters and adapted for removal or insertion only when said counters are locked, whereby said counters cannot under normal conditions be actuated unless said limiting mechanism is in position, substantially as described.

120. In a voting-machine, the combination, with a series of counters, of means for locking the same against operation when they are exposed to view, a limiting mechanism, removably connected with said counters, and adapted for removal or insertion only when said counters are locked, whereby said counters cannot be actuated unless said limiting mechanism is in position, and means to register the number of removals of said limiting mechanism, substantially as described.

121. The combination, in a voting-machine, of the main frame, with the counters provided therein, a limiting mechanism having an independent frame removable from said main frame, said limiting mechanism being normally connected with said counters for controlling the operation thereof, and said counter being inoperative when not so connected, substantially as described.

122. The combination, in a voting-machine, of a series of counters, with the limiting mechanism, and means whereby when an attempt is made to remove said limiting mechanism said counters are locked against further operation, substantially as described.

123. The combination, in a voting-machine, of a series of counters, with means for operating the same, means for exposing the counters or obtaining the count or record from said counters, and locking the same against further operation, and means for registering the number of times that the machine is thus rendered inoperative, substantially as described.

124. The combination, in a voting-machine, of a series of counters, with means for operating the same, means permitting the obtaining of the count or record from said mechanism, and automatically locking the same against further operation, substantially as described.

125. The combination, with a series of counters, of a mechanism for limiting the operation of said counters, means for resetting said limiting mechanism, and automatic independently-operated means for locking said counters as said limiting mechanism is being reset, substantially as described.

126. In a voting-machine, the combination, of two or more series of counters, a limiting-shaft for each series, and operable with any counter in said series, interlocking means operative by either one of the shafts to lock both thereof, substantially as described.

127. In a voting-machine, the combination of two or more series of counters, with a limiting-shaft for each series and operable with any counter therein, interlocking means operative by either of said shafts without the movement of the other shaft to lock both of said shafts after predetermined movements, substantially as described.

128. In a voting-machine, the counters and their actuators, for positive and negative votes upon amendments or questions, a limiting-shaft for each, and a limiting mechanism geared to both shafts to be positively operated by one and operate the other to prevent the operation of the other by its actuator, as and for the purpose specified.

129. The combination, in a voting-machine, of two or more rows of counters and their actuators, with a belt for each row and preventing the operation of the counters therein except by a certain mechanism, and interlocking means positively and directly engaging said belts to prevent the operation of more than one thereof at a time, substantially as described.

130. The combination, in a voting-machine, of a series of counters, with a limiting mechanism in connection therewith, an independent locking mechanism for said counters, and means independent of said limiting mechanism for locking said counters and said limiting mechanisms when or before said counters are exposed to view, substantially as described.

131. The combination, in a voting-machine, of two or more series or rows of counter devices, with a movable belt or cover for each series or row, each provided with an operating device, and locks engaging said belts to prevent the operation of more than one thereof at a time, substantially as described.

132. In a voting-machine, the combination, with two or more series or rows of counter devices, of a movable belt or cover for each series or row, each provided with an operating device, and yielding means engaging said belts and preventing the operation of more than one of said belts at a time, substantially as described.

133. The combination, in a voting-machine, of the movable belts or covers for the counter-actuators, with independent belt-locks, any one of said locks adapted to be operated and thereby disengaged from its belt by the operation of said belt, and means to prevent the disengagement of the other belt-locks thereafter until the first belt is returned to its normal position, substantially as described.

134. The combination, in a voting-machine, of the series of voting devices, with a movable belt for each series, independent belt-locks, and all of said belts being normally operative, but the other being locked after any one is operated and until the operated belt is returned to its normal or initial position, substantially as described.

135. The combination, in a voting-machine, of the movable belts or covers for the counter-actuators, with a separate belt-lock for each belt, and means associating said locks and permitting the operation of one only of said locks at a time, substantially as described.

136. The combination, in a voting-machine, of two or more movable belts or covers with a locking mechanism for each, to engage the belts, when an attempt is made to operate the belt, and interlocking means between said locking mechanisms to prevent the operation of more than one thereof at a time, substantially as described.

137. The combination, in a voting-machine, of two or more belts, with a flexible cross-band, a locking mechanism engaging each belt and the movements of said mechanisms being limited by the said flexible band to prevent the movement of more than one of the said belts at a time, substantially as described.

138. The combination, in a voting-machine, of two or more belts or covers for the different rows of actuators, with a locking mechanism to engage each belt and to be unlocked by the movement thereof, and means for the operation of one of said locks to prevent the unlocking of the other locks by the movement of their belts, substantially as described.

139. The combination, in a voting-machine, of two or more belts, as described, with the pulleys and the shafts whereon said pulleys are adapted to rotate freely, and means engaging said belts to prevent the operation of more than one thereof at a time, substantially as described.

140. The combination, in a voting-machine, of two or more belts, as described, with the pulleys, and the shafts whereon said pulleys are adapted to rotate freely, means engaging said belts to prevent the operation of more than one thereof at a time, and said means adapted to be actuated by the initial movement of either belt to lock the other or others, substantially as described.

141. The combination, in a voting-machine, of two or more belts of the character described, with a flexible strap or band extending transversely thereto, a plunger for each belt to operate upon said transverse band, and a device for each belt actuated by the movement thereof to operate upon a corresponding plunger to flex said transverse band, and said transverse strap or band having a limited slack whereby upon the operation of the device in connection with one belt the other belt or belts are locked against operation, substantially as described.

142. The combination, in a voting-machine, of two or more belts of the character described, with a lock-plunger for each, a transverse strap or band to be flexed by said plungers adapted to return said plungers, substantially as described.

143. The combination, in a voting-machine, of two or more belts of the character described, with a transverse strap, plungers to operate upon said transverse strap, said belt having a limited slack, devices actuated by respective belts to operate said plungers, yielding means interposed between each belt and its plunger whereby one plunger may be actuated to flex said strap, and the interposed other devices will yield and not operate the plungers, and fixed stops for the devices in connection with said belts and controlled by said plungers, substantially as described.

144. In a voting-machine, the combination, with two or more belts of the character described, with the transverse, flexible band, a locking device for each belt operable thereby to flex said transverse band, and fixed stops for said devices whereby after the operation of one thereof the others will yield to said flexible band and are locked against movement by said fixed stop, substantially as described.

145. The combination, in a voting-machine, with belts of the character described, with a transverse flexible band, plungers to operate thereon, locking-levers engaging said belts and operable upon said plungers, a spring interposed between each said lever and its plunger, and a delicate or comparatively weak transverse band employed as an interlocking device between the belt-plungers, substantially as described.

146. The combination, in a voting-machine, of two or more belts of the character described, each provided with an opening, with a lever for each band projecting into an opening thereof, a transverse belt having a limited slack and adapted to be operated upon by said levers and to prevent the operation of more than one thereof at a time, substantially as described.

147. The combination, in a voting-machine, of two or more movable operators, with the plates or belts movable therewith, locks engaging said belts, a yielding device engaged by said locks and preventing the operation of more than one thereof at a time, substantially as described.

148. The combination, in a voting-machine, of two or more belts, as described, with yielding locking devices engaging the same and adapted when receiving more than a given pressure to lock said belts, substantially as described.

149. The combination, in a voting-machine, of two or more locking devices, with belts for operating the same independently, and an interlocking band yieldingly arranged between said locking devices, substantially as and for the purpose specified.

150. The combination, in a voting-machine, of two or more belts, as described, each having an opening, with a lock engaged in each, said locks adapted one at a time to be disengaged from its belt by the movement thereof, and in moving to lock the others and the belts engaged thereby, substantially as described.

151. The combination, in a voting-machine, with two or more belts of the character described, of rotatable levers engaged therewith and adapted to be rotated or swung thereby, and means to prevent the swinging of more than one of said levers at a time, substantially as described.

152. The combination, in a voting-machine, of two or more belts of the character described, each provided with an opening, with locking devices or levers projecting into said openings, said devices adapted to be rotated by the movement of said belts, a flexible belt, means in connection therewith and with said levers to prevent the rotation of more than one of said levers at a time, substantially as described.

153. The combination, in a voting-machine, of two or more belts of the character described, each provided with an opening, with locking devices or levers projecting into said openings, each said device adapted to be rotated by the movement of its respective belt, a flexible belt, means in connection therewith and with said levers to prevent the rotation or freeing of more than one of said levers at a time, said levers being reinstated by the return of said belts, substantially as described.

154. The combination, in a voting-machine, of a movable belt or plate of the character described, provided with an operating knob or key, with a series of counters, actuators covered by said plate or belt, said actuators having broad faces of greater width than said key, and separated by narrow partitions or bars, substantially as described.

155. In a voting-machine, the combination, with a belt of the character described, of a bracket or box provided thereon, a key or button arranged in said bracket or box to operate upon devices concealed by said belt, and an annunciator provided within said box or casing and actuated by said knob or key, substantially as described.

156. In a voting-machine, the combination, of two or more belts of the character described, with a key or button upon each, an annunciator in connection with each key or button, and a series of counter devices concealed and locked by said belt, substantially as described.

157. The combination, in a voting-machine, of the belt or movable plate and the actuators to be operated, of a key for actuating said actuators, and arranged upon said belt, an annunciator, means for locking said annunciator, and a trip operated by said key or button at the end of its stroke to liberate said annunciators, substantially as described.

158. In a voting-machine, the combination, with two or more rows of voting mechanisms, of an annunciator for use with each row of devices, and interlocking means preventing the operation of more than any one annunciator at a time, substantially as described.

159. In a voting-machine, the combination, with two or more rows of voting mechanisms, and means for operating the same, of an annunciator for each row of devices, interlocking means preventing the operation of more than one annunciator at a time, and means to prevent the operation of an annunciator until the voting mechanism has been fully or properly actuated by the operating means, substantially as described.

160. In a voting-machine, the combination, of counters and counter-actuating mechanisms, with a manual actuator capable of repeated operation without operating said actuating mechanisms after the first actuation thereof, and an annunciator provided in connection with said manual actuator to indicate when a complete movement of said manual actuator has been effected, substantially as described.

161. In a voting-machine, the voting mechanisms, in combination with means preventing a second operation of any voting mechanism by the same voter, and an indicator or annunciator which may be operated any number of times to check or verify a voter's ballot and which disappears after each operation, substantially as described.

162. In a voting-machine, the combination, of a series of counters, with operating means, a limit device for said series and an annunciator adapted to indicate after the limit device has received its impulse and before the counter is operated, substantially as described.

163. In a voting-machine, a series of counters and counter-actuators, a manual actuator capable of actuating any counter-actuator in said series, an annunciator for indicating when said counter-actuator has been operated, substantially as described.

164. In a voting-machine, the combination, of a voting mechanism, with a booth or voting-chamber, provided with an exit mechanism employed for certain resetting or returning operations of or upon the voting mechanisms, and independently-operable annunciators arranged upon said machine, substantially as described.

165. In a voting-machine, the combination, of a series of counter devices capable of single operations only by one voter, with a single annunciator operable with any one of said counter devices, and means for restoring said annunciator to allow repeated operations thereof by one voter to verify his vote, substantially as described.

166. The combination, with a voting-machine, of a booth or voting-chamber, said voting-chamber having means of exit and means locking the same, and said machine having counter-operators and means to prevent the exit of a voter from the booth until the return of said operators to their normal positions, substantially as described.

167. In a voting-machine, a system or set of visual annunciators upon the machine, in combination with means preventing the operation of more than one thereof at a time, and means causing the concealment thereof after operation and while the voter is before the machine, whereby said annunciators while indicating to the voter the vote cast will prevent other persons following and reading his ballot, substantially as described.

168. In a voting-machine, a key or button coöperating with limiting or interlocking devices to prevent the casting of more than a given number of votes at a time, a booth and means compelling the completion of a vote started before the voter can leave the booth, substantially as described.

169. In a voting-machine, the combination, of a series of counter-actuating devices and counters, and automatic means for locking the same when exposed to view, with operators, said operators being also locked against operation when the counters are exposed to view, substantially as described.

170. In a voting-machine, the combination, of a series of counters and actuating devices, with an operator automatically locked to prevent the working thereof when the count is exposed to view, substantially as described.

171. In a voting-machine, the combination, of counter-actuators, with an operator, positive means operated by a resetting mechanism for returning said actuators, and independent means for returning said operator, substantially as described.

172. The combination, in a voting-machine, of two or more positively-actuated automatic counter-locking mechanisms positively securing said devices against operation, and operators normally operable upon different counters but rendered inoperative by said locking mechanisms when the same are locked, substantially as described.

173. In a voting-machine, the combination, with two or more counter-actuator-securing mechanisms, of independent locks in engagement therewith, and an interlocking device limiting the operation of said locks to one at a time, substantially as described.

174. In a voting-machine, the combination, with two or more counter-actuator-securing mechanisms, of independent locks in engagement therewith, and an interlocking device between said locks and having yielding or cushioned connections therewith to prevent the operation of more than one lock at a time, substantially as described.

175. In a voting-machine, the combination, with two or more sets of voting mechanisms, of a securing mechanism for each set, preventing the operation of more than one in a set at a time, a lock device in connection with each securing mechanism, and a yielding interlocking device operable before or between said locks to limit the movement or operations of said securing mechanisms to one at a time, substantially as described.

176. In a voting-machine, the combination of two or more rows or sets of voting mechanisms, with as many securing mechanisms permitting the operation of but a given number in a set at a time, a movable lock device engaged with each said securing mechanism, a yielding limiting interlocking device operable by or between said locks, and said locks having yielding connections or bearings upon said yielding interlocking device, whereby after the exertion of a given pressure upon one of said locking devices, the other securing devices are automatically secured, substantially as described.

177. The means for recording votes, comprising in combination a machine for recording party-votes, with a machine for the recording of independent votes, and a machine for recording votes upon amendments or questions, each of said machines having a movable part under the control of the voter, and the movable parts of the first two mentioned machines being operatively connected by an interlocking mechanism adapted to lock one upon the operation of the other, and said amendment-machine being independent of the other machines, for use in connection with either thereof, substantially as described.

178. In a voting-machine, the combination of a series of free-ballot mechanisms, with a movable slide or cover therefor, two or more series of regular-party-voting mechanisms, a movable cover for each thereof, parts to engage with said covers, and an interlocking mechanism coöperating therewith, substantially as described.

179. In a voting-machine, the combination of two or more rows of counter devices, with a like number of movable covers or belts therefor, a flexible belt or band to prevent the operation of more than one of said covers or belts at a time, and means whereby if an attempt is made to move another belt or belts the same is or are locked positively and independently of said flexible belt, substantially as described.

180. In a voting-machine, the combination of counter-actuators, with two or more belts protecting and locking the same, one thereof being movable at a time, and the locking devices employed for locking the belts being positively actuated only when an attempt is made to operate said belts independently, substantially as described.

181. In a voting-machine, the combination, of a series of free-ballot mechanisms with means for operating the same, a slide or cover, means for returning the same to the starting-point when said mechanisms are exposed to view and locking the same, substantially as described.

182. The combination, in a voting-machine, of the frame or body, with a series of counting mechanisms provided therein, entrance and exit doors or turnstiles carried or attached to shafts upon said frame, a shaft common thereto, locking means in connection therewith, counter-mechanism-locking devices actuated from said shaft, and means for locking said shaft and said counter mechanism when the counters are exposed to view, substantially as described.

183. An automatic voting-machine provided with means for automatically locking the counting mechanisms upon exposure thereof to view, in combination, with means whereby the said mechanisms are thereafter held locked regardless of the removal of the machine from its booth or disconnection therefrom, substantially as described.

184. The combination, with voting mechanisms, of an interlocking mechanism, a booth containing the same and provided with entrance and exit doors or devices, and means in connection with said interlocking mechanism for preventing the operation of the machine to register votes or obtain the count independently of the operation of said doors or devices and the parts of the machine actuated thereby, substantially as described.

185. The combination, in a voting-machine, of the counting mechanisms representing the regular-party candidates, with counting mechanisms representing amendments or questions, distinct limiting mechanisms provided in connection with the regular-party-counting mechanisms and said amendment or question counting mechanisms, said counting mechanisms and limiting mechanisms being adapted to be respectively set and operated by a voter, and positively-actuated means for operating all of the counting mechanisms that have been set by a voter and positively resetting both of the limiting mechanisms to register the votes of the voter and put the machine in condition for use by the next voter, substantially as described.

186. The combination, in a voting-machine, of a series of free-ballot mechanisms, with a single slide or cover which in one position locks all of said mechanisms against use, and in the other position permits the use of any of the same, and a register showing the number of operations of said slide or cover, substantially as described.

187. In a free-ballot mechanism, the combination, of tape-winding mechanisms, with means for disclosing the same to a voter, automatically-locked means for concealing the votes or names written thereon, and means thereafter operable for rewinding said strip to ascertain the result of the free ballot, substantially as described.

188. In a free-ballot mechanism, the combination, with a movable tape or strip, of means for covering and locking the same when the polls are closed, and means to prevent the removal or writing upon of said strip by any person when the strips are exposed to view after the polls are closed, substantially as described.

189. The combination, in a ballot-machine, of a vote-recording mechanism whereon the vote is recorded by a suitable impression device, and means for concealing the record thereof after the same has been once exposed to view to determine the number of votes cast, substantially as described.

190. The combination, in a free-ballot mechanism, of a series of winding devices and rewinding means, with a single slide or cover therefor, means for locking said slide or cover, regular-party tickets, and an interlocking mechanism between the same and said slide, substantially as described.

191. The combination, in a free-ballot mechanism, of a series of movable devices to be written upon, with a single slide for covering the same and to be opened by the voter, and automatic means actuated by the exit of the voter for returning said slide, substantially as described.

192. The combination, in a free-ballot mechanism, of winding devices and rewinding means, with a slide or cover, means for locking said slide or cover, regular-party tickets, an independent locking mechanism between the same and said slide, and automatically-operated liberating means in connection with the interlocking device for said tickets and slide, substantially as described.

193. The combination, with a movable strip, of carriers therefor, a writing-plate and slot, a cover for the slot, means automatically locking said cover when the votes are exposed, and other means covering or protecting the strip to prevent the record of unauthorized votes thereon, substantially as described.

194. The combination, in a voting-machine, of a movable strip, with carriers, and moving means, rewinding means, a cover for said strip, and a protector preventing the recording of unauthorized votes upon said strip, but beneath which the names on the strip are visible when the cover is removed, substantially as described.

195. The combination, in a voting-machine, of a movable strip, with a cover therefor, moving means, rewinding means, and closely-arranged strips or bars preventing the writing of unauthorized votes on the strip when the same is rewound, substantially as described.

196. In a voting-machine, the combination, with a series of counting mechanisms and means for locking the same against movement in either direction, of a door, and means in connection therewith for permanently securing said locking means to permanently lock said counting mechanism before or when said door is opened, substantially as described.

197. The combination, in a voting-machine, of the counting mechanism, with a door concealing the same from view, a latch therefor, a counting-mechanism-locking device, the latch upon said door being dependent for its operation upon said locking device, whereby the door cannot be opened until said counting devices are locked against further operation, substantially as described.

198. The combination, with the counting mechanisms, of the locking mechanism therefor, the door concealing said counting mechanisms, and mechanisms preventing the opening of said door without first locking said counters, substantially as described.

199. The combination, with the counting mechanisms, of the locking mechanisms therefor, the door concealing said counting mechanisms, and means whereby said door cannot be opened without first locking said counters and registering the number of times the door is opened, substantially as described.

200. The combination, in a voting-machine, of the counting mechanism, with the door or like part concealing the same, a lock or latch for said door, and another lock having a limited movement and connected with the door-lock to permit the door to be only once opened and relocked, substantially as described.

201. The combination, in a voting-machine provided with a counter-concealing door or part, of a lock or latch therefor, a shaft, a ratchet mechanism thereon operated by the lock or latch of said door, and said shaft having only a limited movement whereby the door can be opened and relocked but once without first releasing said shaft, substantially as described.

202. The combination, in a voting-machine provided with a counter-concealing door or part, of a lock or latch therefor, a shaft, a ratchet mechanism thereon operated by the lock or latch of said door, said shaft having only a limited movement whereby the door can be opened and relocked but once without first releasing said shaft, and a "city clerk's" lock in connection with said shaft, substantially as described.

203. The combination, in a voting-machine, of a series of counting mechanisms and the actuators therefor, with locking devices therefor, permanent locking devices operable thereon, and a booth having a movable part for the actuation of said locking devices, substantially as described.

204. The combination, in a voting-machine, of ballot-strips, a cover on one side thereof, a door or slide upon the other, which latter when opened permits the inspection of the votes, automatic means in connection with said cover locking the same when said door or slide is opened, and means retaining the same in its locked condition operable only by a given officer to free said cover, substantially as described.

205. The combination with a voting-machine and a booth, of an exit device, said machine having a part movable by the voter and a mechanism operating to prevent the working or unlocking of said exit device after the voter enters the booth until the return of said part movable by the voter to its normal position, substantially as described.

206. The combination in a voting-machine, of the machine proper, with a booth and an extra door or part, a movable voting part upon said machine and means preventing the operation of said door or exit part until the return of said part to its normal position, substantially as described.

207. The combination, with a voting-machine having one or more voting-keys or operators of the character described and an exit door or part controlled by said voting-keys, substantially as described.

208. The combination of the movable voting-keys or operators of a voting-machine with a flexing band or part coacting therewith, and an exit-door or like device controlled by said band, substantially as described.

209. A voting-machine having voting-keys, in combination with means compelling a voter to return the same to normal positions before leaving the same, substantially as described.

210. The combination, in a voting-machine, of a suitable frame with the voting mechanisms provided therein, a limiting mechanism common to said voting mechanisms and having an independent frame, a lock for securing the framed limiting mechanism in the machine-frame, said limiting mechanism with its frame being adapted for ready removal from the machine-frame without disturbing said voting mechanisms, substantially as described.

211. The combination, in a voting-machine, of a suitable frame with the voting mechanisms provided therein, a limiting mechanism common to said voting mechanisms and having an independent frame, a lock for securing the frame-limiting mechanism in the machine-frame, said limiting mechanism with its frame being adapted for ready removal from the machine-frame without disturbing said voting mechanism, and a register provided in connection with said frame of the limiting mechanism to prevent the removal thereof and the substitution of another without a record being made thereof, substantially as described.

212. In a voting-machine, the combination with a series of counting mechanisms representing different candidates in several political parties and each comprising a counter proper and an actuator, the latter adapted for a given movement only in one direction by a voter, a limiting mechanism adapted for movement only with said actuators that are operated by a voter, positive means for returning said actuators, resetting said limiting mechanism and operating the counters for which actuators have been operated by the voter only and wholly during the return of said actuators and the limiting mechanism, substantially as described.

213. The combination, in a voting-machine, of two or more counting-wheels with a locking-pawl for each, an actuator for operation by a voter and operatively connected with said wheels, a rocking shaft and means thereon to engage and operate said actuator and said pawls successively, substantially as described.

214. In a voting-machine, the combination of the regular-candidate-voting mechanism and a limiting mechanism associated therewith, with a free-ballot mechanism having a part movable by a voter, interlocking means preventing the use by a voter of both the regular-candidate-voting mechanism and the free-ballot mechanism, a closure and means for arbitrarily operating said limiting mechanism upon the departure of every voter from the closure and positively operating said free-ballot mechanism only upon the departure from the closure of a voter who has operated the movable part of said free-ballot mechanism, substantially as described.

215. In a voting-machine, the combination of the regular-candidate-voting mechanisms with a series of free-ballot mechanisms having independent tapes or strips to receive the voter's marks, a single part movable to permit voting upon said free-ballot mechanisms and lock said regular-candidate mechanisms against operation by the same voter, and means for resetting the movable part of said free-ballot mechanisms for the next voter, and also simultaneously operating all said free-ballot mechanisms to prepare said strips for the next voter, substantially as described.

216. The combination of a booth or closure with a voting-machine, comprising the frame, the plurality of regular-candidate-voting mechanisms, the plurality of free-ballot mechanisms, the limiting and resetting mechanisms of said regular-candidate-voting mechanisms, an interlocking mechanism between said regular-candidate-voting mechanisms and said free-ballot mechanisms, and positively-actuated means for operating said free-ballot mechanisms only after a voter's operation thereon, and the same means positively operating upon said limiting and resetting mechanisms for each voter who enters said booth or closure, substantially as described.

217. In a voting-machine, the combination of the voting mechanisms with the auxiliary limiting mechanisms associated therewith for the purpose specified and operable by a voter, a movable limiting device proper having a certain and positive movement for every voter regardless of the movement or degree of movement of any of said auxiliary limiting mechanisms to reset the machine for the next voter, substantially as described.

218. A voting-machine comprising the frame and voting mechanisms therein, resetting and locking means, a limiting mechanism in connection with said voting mechanisms and having parts for operation by a voter when casting his ballot, a closure and means in connection therewith for positively and arbitrarily operating said resetting and locking means and said limiting mechanisms for every voter entering and departing from said closure whether voting or not, substantially as described.

219. A voting-machine comprising the frame and voting mechanisms therein, resetting and locking means, a limiting mechanism in connection with said voting mechanisms and having parts for operation by a voter when casting his ballot, a closure and means in connection therewith for positively and arbitrarily operating said resetting and locking means and said limiting mechanisms for every voter entering and departing from said closure, and a series of independent or free-ballot mechanisms and means for operating the same only when one or more thereof have been voted upon, substantially as described.

220. The combination, in a voting-machine of a series of regular-candidate-counter devices with a series of free-ballot-vote-receiving mechanisms equal in number to the offices represented by counter devices and means preventing the use by a voter of any of said counter devices when said free-ballot-receiving mechanisms are used by a voter, substantially as described.

221. A voting-machine having as many office tiers of counting devices as are required for the largest of the several different elections in a given locality, each of said tiers having a limiting mechanism for controlling the operation of its counting devices and all together operable in conjunction with a suitable grouping device to control and limit the number of votes by any one voter, and said machine being provided with as many such grouping devices as there are different kinds of elections wherein said machine is to be used from year to year in said locality, said grouping devices being similar but of different set or fixed constructions each corresponding to the requirements of a certain one of said elections and each when placed in said machine controlling the coöperative relations of said tiers according to the single-office and multi-office voting requirements of the election to which it is appropriated, whereby by the simple act of substituting one grouping device for another all said counting and limiting devices of the machine are adapted to requirements of another election, substantially as described.

222. A voting-machine, having its counting mechanisms arranged in series or rows, the combination of limiting mechanisms for each row to limit the number of votes that can be cast in any one series by one voter, said limiting mechanisms adapted together for employment with one grouping device to control the number of votes by one voter for candidates for different offices represented throughout the machine, and said machine having two or more of such grouping devices either one of which is adapted for employment therewith according to the kind of election in which the machine is to be used, and each of said grouping devices comprising a series of movable stops, one for each of said limiting mechanisms, and movable therewith by a voter, and certain of said stops being connected to render their corresponding limiting mechanisms in the machine coöperative for multicandidate voting, said stops being otherwise independent throughout the grouping device, and said device also having means movable when within the machine to reset its movable stops, and the arrangement of the stops upon the said grouping devices corresponding with the requirements for different elections whereby by the removal from the machine of one grouping device of a fixed construction and the insertion of the other of a different fixed construction, said machine is adapted for employment in a different election, substantially as described.

223. In a voting-machine, the combination of a suitable machine-frame, with a number of tiers of counter devices, representing a number of different offices, a movable auxiliary limiting mechanism for each tier, and a grouping device by which alone the coöperative relations and operations of all said limiting mechanisms are controlled, said grouping device being of a determined character, and the coöperative connections between said limiting mechanisms and said grouping device permitting the ready substitution therefor of another grouping device, for all said limiting mechanisms, but of a different determined character, and compelling the proper grouping of said mechanisms for a different election, substantially as described.

224. In a voting-machine, the combination of a suitable machine-frame with a number of tiers of counter devices, each tier having an auxiliary limiting mechanism operable by a voter and some thereof being coöperative for purposes of multicandidate voting, any adjacent limiting mechanisms being adapted for coöperative interconnection, and means compelling the proper relative or coöperative relations of said limiting mechanisms for each of said elections, substantially as described.

225. A voting-machine having as many tiers of counting devices as are required for the largest of several different elections in a given locality, said tiers having auxiliary limiting mechanisms controlling the operation of the counting devices and said machine being provided with as many general limiting or grouping devices as there are different kinds of elections to be held from year to year in said locality, said grouping devices being of different predetermined constructions for respective elections and adapted for use one at a time with said limiting mechanisms in said machine, and controlling the coöperative relations of said limiting mechanisms of all the tiers, and each grouping device alone when coöperating with said limiting mechanisms adapting the machine as a whole to a particular election, and compelling the proper grouping of said tiers, substantially as described.

226. In a voting-machine, the combination of a suitable frame with tiers or series of counter devices for a number of different kinds of offices, a limiting mechanism for each of said tiers of counter devices, a single stop and grouping device determining or controlling the degree of possible movement by one voter of each of said limiting mechanisms, and said stop and grouping device being readily movable with respect to said limiting mechanisms, to be replaced by another stop and grouping device of a different predetermined construction, to adapt the machine to a different election, substantially as described.

227. In a voting-machine, having its counting mechanisms arranged in series or rows, the combination of mechanisms for limiting the number of votes that can be cast in any one series, with one integral grouping device for the entire machine, said limiting mechanism being normally independent of the grouping device, said grouping device being capable of modification whereby any two or more adjacent series of limiting mechanisms may be thrown into one group and any number of groups may be formed by changing the one grouping device, substantially as described.

In testimony whereof I have hereunto set my hand this 24th day of December, A. D. 1897.

JAMES H. DEAN.

In presence of—
C. G. HAWLEY,
RICHARD PAUL.